US012561669B2

(12) United States Patent
   Cook et al.

(10) Patent No.: US 12,561,669 B2
(45) Date of Patent: Feb. 24, 2026

(54) SYSTEMS AND METHODS FOR A TRANSACTION CARD HAVING A CRYPTOGRAPHIC KEY

(71) Applicant: Wells Fargo Bank, N.A., San Francisco, CA (US)

(72) Inventors: Deana Cook, Wilmington, DE (US); Darrell L. Suen, San Ramon, CA (US); William E. Wheeler, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/657,526

(22) Filed: May 7, 2024

(65) Prior Publication Data

US 2025/0348862 A1     Nov. 13, 2025

Related U.S. Application Data

(63) Continuation of application No. 18/117,654, filed on Mar. 6, 2023, now Pat. No. 12,014,354, which is a (Continued)

(51) Int. Cl.
   *G06Q 20/34*          (2012.01)
   *G06Q 20/40*          (2012.01)
(52) U.S. Cl.
   CPC ....... *G06Q 20/352* (2013.01); *G06Q 20/4012* (2013.01); *G06Q 20/40145* (2013.01); *G06Q 20/40975* (2013.01); *G06Q 2220/00* (2013.01)
(58) Field of Classification Search
   CPC ............. G06Q 20/352; G06Q 20/4012; G06Q 20/40145; G06Q 20/40975; G06Q 2220/00
   See application file for complete search history.

(56) References Cited

U.S. PATENT DOCUMENTS 6,324,524 B1    11/2001   Lent et al.
6,575,361 B1     6/2003   Graves et al.
(Continued)

FOREIGN PATENT DOCUMENTS

AU          2018101214 A4      9/2018
CN          105357190 A        2/2016
(Continued)

OTHER PUBLICATIONS

EMV, "Integrated Circuit Card Specifications for Payment Systems,"— v. 4.3, Book 3, 2011. (Year: 2011).

(Continued)

*Primary Examiner* — Patrick McAtee
*Assistant Examiner* — Vincent I Idiake
(74) *Attorney, Agent, or Firm* — Foley & Lardner LLP

(57)          ABSTRACT

A method of accessing an account includes receiving, from a device, randomly generated seed information and an encrypted key or token generated by a card using the randomly generated seed information via a contactless communication between the card and the device; decrypting the encrypted key or token using a decryption process that includes the randomly generated seed information and the encrypted key or token as inputs in response to determining that the randomly generated seed information does not match previously received seed information; and providing, to the device and based on the decrypted key or token, access to the account.

20 Claims, 13 Drawing Sheets

Related U.S. Application Data continuation of application No. 16/703,513, filed on Dec. 4, 2019, now Pat. No. 11,599,871.

(60) Provisional application No. 62/902,247, filed on Sep. 18, 2019.

(56) References Cited

U.S. PATENT DOCUMENTS

| | | | |
|---|---|---|---|
| 7,013,393 B1 | 3/2006 | Stevens | |
| 7,121,456 B2 | 10/2006 | Spaeth et al. | |
| 7,146,159 B1 | 12/2006 | Zhu | |
| 7,818,264 B2 | 10/2010 | Hammad | |
| 8,205,249 B2 | 6/2012 | Quigley et al. | |
| 8,245,292 B2 | 8/2012 | Buer | |
| 8,313,022 B2 | 11/2012 | Hammad et al. | |
| 8,332,325 B2 | 12/2012 | Faith et al. | |
| 8,352,323 B2 | 1/2013 | Fisher | |
| 8,355,982 B2 | 1/2013 | Hazel et al. | |
| 8,380,177 B2 | 2/2013 | Laracey | |
| 8,430,325 B2 | 4/2013 | Jain | |
| 8,452,707 B2 | 5/2013 | Sharma | |
| 8,511,547 B2 | 8/2013 | Rans et al. | |
| 8,635,157 B2 | 1/2014 | Smith et al. | |
| 8,639,629 B1 | 1/2014 | Hoffman | |
| 8,763,896 B2 | 7/2014 | Kushevsky et al. | |
| 8,856,045 B1 | 10/2014 | Patel et al. | |
| 8,910,055 B2 | 12/2014 | Berger | |
| 8,918,855 B2 | 12/2014 | Singh et al. | |
| 8,977,569 B2 | 3/2015 | Rao | |
| 9,135,619 B1 | 9/2015 | Simakov et al. | |
| 9,183,480 B1 | 11/2015 | Quigley et al. | |
| 9,195,984 B1 | 11/2015 | Spector et al. | |
| 9,208,634 B2 | 12/2015 | Lam | |
| 9,218,624 B2 | 12/2015 | Moghadam | |
| 9,256,873 B2 | 2/2016 | Patel et al. | |
| 9,317,848 B2 | 4/2016 | Hammad | |
| 9,367,845 B2 | 6/2016 | Candelore et al. | |
| 9,374,373 B1 * | 6/2016 | Chan | H04L 9/3247 |
| 9,542,673 B2 | 1/2017 | Tanner et al. | |
| 9,547,857 B2 | 1/2017 | Moghadam | |
| 9,547,859 B2 | 1/2017 | Patel et al. | |
| 9,576,285 B2 | 2/2017 | Zhou | |
| 9,619,794 B2 | 4/2017 | Zhou et al. | |
| 9,652,770 B1 | 5/2017 | Kurani et al. | |
| 9,741,036 B1 | 8/2017 | Grassadonia et al. | |
| 9,785,943 B2 | 10/2017 | Phillips et al. | |
| 9,805,370 B1 | 10/2017 | Quigley et al. | |
| 9,813,236 B2 | 11/2017 | Buer | |
| 9,830,328 B2 | 11/2017 | Faith et al. | |
| 9,830,589 B2 | 11/2017 | Xing | |
| 9,846,863 B2 | 12/2017 | Grossi et al. | |
| 9,852,426 B2 | 12/2017 | Bacastow | |
| 9,928,493 B2 | 3/2018 | Parker et al. | |
| 9,947,183 B2 | 4/2018 | Priebatsch | |
| 10,049,352 B2 | 8/2018 | Klingen et al. | |
| 10,074,231 B2 | 9/2018 | Miranda et al. | |
| 10,089,624 B2 | 10/2018 | Hammad et al. | |
| 10,102,364 B2 | 10/2018 | George | |
| 10,162,956 B1 | 12/2018 | Truong et al. | |
| 10,198,725 B2 | 2/2019 | Royyuru et al. | |
| 10,198,728 B2 | 2/2019 | Huxham et al. | |
| 10,262,320 B2 | 4/2019 | Moghadam | |
| 10,373,138 B2 | 8/2019 | Hammad | |
| 10,395,244 B1 | 8/2019 | Mossler et al. | |
| 10,438,210 B1 | 10/2019 | Perezleon et al. | |
| 10,462,128 B2 | 10/2019 | George | |
| 10,467,622 B1 | 11/2019 | Rule et al. | |
| 10,484,366 B2 | 11/2019 | George | |
| 10,489,781 B1 | 11/2019 | Osborn | |
| 10,510,074 B1 | 12/2019 | Rule et al. | |
| 10,541,995 B1 | 1/2020 | Mossler et al. | |
| 10,586,224 B2 | 3/2020 | Tanner et al. | |
| 10,607,214 B1 | 3/2020 | Rule et al. | |
| 10,607,216 B1 | 3/2020 | Ilincic et al. | |
| 10,636,241 B1 | 4/2020 | Rule et al. | |
| 10,643,420 B1 | 5/2020 | Rule et al. | |
| 10,685,349 B2 | 6/2020 | Brickell et al. | |
| 10,719,833 B2 | 7/2020 | Patel et al. | |
| 10,733,283 B1 | 8/2020 | Osborn et al. | |
| 10,740,444 B2 | 8/2020 | Cho et al. | |
| 10,769,299 B2 | 9/2020 | Rule et al. | |
| 10,803,463 B1 | 10/2020 | Barnum et al. | |
| 10,825,018 B2 | 11/2020 | Moghadam | |
| 10,957,143 B2 | 3/2021 | Rule et al. | |
| 11,004,074 B1 | 5/2021 | Hiccox et al. | |
| 11,037,139 B1 | 6/2021 | Ho | |
| 11,062,302 B1 | 7/2021 | Ho et al. | |
| 11,100,431 B2 | 8/2021 | Mullen et al. | |
| 11,138,593 B1 | 10/2021 | Ho | |
| 11,138,605 B2 | 10/2021 | Aabye et al. | |
| 11,200,563 B2 | 12/2021 | Cody et al. | |
| 11,210,656 B2 | 12/2021 | Rule et al. | |
| 11,301,848 B2 | 4/2022 | Ilincic et al. | |
| 11,301,857 B1 | 4/2022 | Adam | |
| 11,334,872 B2 | 5/2022 | Phillips et al. | |
| 11,348,150 B2 | 5/2022 | Singhal et al. | |
| 11,372,954 B2 | 6/2022 | Wiesman et al. | |
| 11,373,169 B2 | 6/2022 | Rule et al. | |
| 11,373,186 B2 | 6/2022 | Sharma et al. | |
| 11,392,933 B2 | 7/2022 | Mossler et al. | |
| 11,416,861 B1 | 8/2022 | Hubley | |
| 11,423,392 B1 | 8/2022 | Ho et al. | |
| 11,436,887 B2 | 9/2022 | Rule et al. | |
| 11,455,626 B2 | 9/2022 | Rule et al. | |
| 11,501,581 B2 | 11/2022 | Hammad et al. | |
| 11,521,213 B2 | 12/2022 | Rule et al. | |
| 11,562,358 B2 | 1/2023 | Rule et al. | |
| 11,615,395 B2 | 3/2023 | Mchugh et al. | |
| 11,625,708 B2 | 4/2023 | Kang | |
| 11,645,646 B2 | 5/2023 | Rule et al. | |
| 11,734,985 B2 | 8/2023 | Rule et al. | |
| 11,875,338 B2 | 1/2024 | Rule et al. | |
| 11,880,823 B2 | 1/2024 | Rule et al. | |
| 11,922,417 B2 | 3/2024 | Rule et al. | |
| 11,961,089 B2 | 4/2024 | Rule et al. | |
| 11,989,731 B2 | 5/2024 | Sharma et al. | |
| 12,056,692 B2 | 8/2024 | Ilincic et al. | |
| 12,061,682 B2 | 8/2024 | Bowers et al. | |
| 12,067,568 B2 | 8/2024 | Osborn et al. | |
| 12,105,789 B2 | 10/2024 | Sharma et al. | |
| 12,112,310 B2 | 10/2024 | Mchugh et al. | |
| 12,112,325 B2 | 10/2024 | Aabye et al. | |
| 12,159,275 B1 | 12/2024 | Ho | |
| 2002/0002466 A1 * | 1/2002 | Kambayashi | H04L 9/0891 |
| 2002/0023051 A1 | 2/2002 | Kunzle et al. | |
| 2002/0116333 A1 | 8/2002 | McDonnell et al. | |
| 2002/0117541 A1 | 8/2002 | Biggar et al. | |
| 2003/0051173 A1 | 3/2003 | Krueger | |
| 2003/0061154 A1 | 3/2003 | Chacko | |
| 2003/0112120 A1 | 6/2003 | Seifert | |
| 2004/0006497 A1 | 1/2004 | Nestor et al. | |
| 2004/0120404 A1 * | 6/2004 | Sugahara | H04N 19/13 |
| | | | 704/E19.044 |
| 2005/0156026 A1 | 7/2005 | Ghosh et al. | |
| 2005/0234860 A1 | 10/2005 | Roever et al. | |
| 2005/0246193 A1 | 11/2005 | Roever et al. | |
| 2005/0269402 A1 | 12/2005 | Spitzer et al. | |
| 2006/0035707 A1 | 2/2006 | Nguyen et al. | |
| 2007/0088611 A1 | 4/2007 | Christiansen | |
| 2007/0187491 A1 | 8/2007 | Godwin et al. | |
| 2008/0010215 A1 | 1/2008 | Rackley, III et al. | |
| 2008/0035725 A1 | 2/2008 | Jambunathan et al. | |
| 2008/0040276 A1 | 2/2008 | Hammad et al. | |
| 2008/0123828 A1 | 5/2008 | Mayer | |
| 2008/0178258 A1 | 7/2008 | Loomis et al. | |
| 2008/0212771 A1 | 9/2008 | Hauser | |
| 2008/0242274 A1 | 10/2008 | Swanburg et al. | |
| 2009/0055648 A1 * | 2/2009 | Kim | H04L 9/0847 |
| | | | 713/171 |
| 2009/0143104 A1 | 6/2009 | Loh et al. | |
| 2009/0156238 A1 | 6/2009 | Smith | |
| 2009/0200371 A1 | 8/2009 | Kean et al. | |
| 2010/0049654 A1 | 2/2010 | Pilo | |
| 2010/0088237 A1 | 4/2010 | Wankmueller | |

(56)    References Cited

U.S. PATENT DOCUMENTS

| | | |
|---|---|---|
| 2010/0125509 A1 | 5/2010 | Kranzley et al. |
| 2010/0161470 A1 | 6/2010 | Wiesman et al. |
| 2010/0198728 A1 | 8/2010 | Aabye et al. |
| 2010/0276484 A1 | 11/2010 | Banerjee et al. |
| 2010/0293382 A1 | 11/2010 | Hammad |
| 2010/0306072 A1 | 12/2010 | Ford et al. |
| 2010/0312703 A1 | 12/2010 | Kulpati et al. |
| 2011/0057031 A1 | 3/2011 | Persaud et al. |
| 2011/0112968 A1 | 5/2011 | Florek et al. |
| 2011/0131108 A1 | 6/2011 | Doxey |
| 2011/0208658 A1 | 8/2011 | Makhotin |
| 2011/0225094 A1 | 9/2011 | Hammad |
| 2011/0270755 A1 | 11/2011 | Pinski |
| 2011/0276487 A1 | 11/2011 | Hammad |
| 2011/0282946 A1 | 11/2011 | Keohane et al. |
| 2011/0302646 A1 | 12/2011 | Ronda et al. |
| 2011/0314095 A1 | 12/2011 | Gupta et al. |
| 2012/0018506 A1 | 1/2012 | Hammad et al. |
| 2012/0039469 A1 | 2/2012 | Mueller et al. |
| 2012/0078735 A1 | 3/2012 | Bauer et al. |
| 2012/0095852 A1 | 4/2012 | Bauer et al. |
| 2012/0123937 A1 | 5/2012 | Spodak |
| 2012/0136786 A1 | 5/2012 | Romagnoli et al. |
| 2012/0136796 A1 | 5/2012 | Hammad et al. |
| 2012/0149331 A1 | 6/2012 | Wu et al. |
| 2012/0209749 A1 | 8/2012 | Hammad et al. |
| 2012/0290449 A1 | 11/2012 | Mullen et al. |
| 2012/0290472 A1 | 11/2012 | Mullen et al. |
| 2012/0317025 A1 | 12/2012 | Wong |
| 2012/0323717 A1 | 12/2012 | Kirsch |
| 2013/0013480 A1 | 1/2013 | Venter |
| 2013/0054412 A1 | 2/2013 | Brendell et al. |
| 2013/0054417 A1 | 2/2013 | O'Donoghue et al. |
| 2013/0054474 A1 | 2/2013 | Yeager |
| 2013/0092741 A1 | 4/2013 | Loh et al. |
| 2013/0117138 A1 | 5/2013 | Hazel et al. |
| 2013/0124346 A1 | 5/2013 | Baldwin et al. |
| 2013/0152185 A1 | 6/2013 | Singh et al. |
| 2013/0159178 A1 | 6/2013 | Colon et al. |
| 2013/0166441 A1 | 6/2013 | Kobylkin et al. |
| 2013/0171929 A1 | 7/2013 | Adams et al. |
| 2013/0198066 A1 | 8/2013 | Wall et al. |
| 2013/0200146 A1 | 8/2013 | Moghadam |
| 2013/0217361 A1 | 8/2013 | Mohammed et al. |
| 2013/0226791 A1 | 8/2013 | Springer et al. |
| 2013/0238455 A1 | 9/2013 | Laracey |
| 2013/0246203 A1 | 9/2013 | Laracey |
| 2013/0262302 A1 | 10/2013 | Lettow et al. |
| 2013/0262317 A1 | 10/2013 | Collinge et al. |
| 2013/0317928 A1 | 11/2013 | Laracey |
| 2013/0318575 A1 | 11/2013 | Hart et al. |
| 2014/0001253 A1 | 1/2014 | Smith |
| 2014/0019352 A1 | 1/2014 | Shrivastava |
| 2014/0052637 A1 | 2/2014 | Jooste et al. |
| 2014/0061299 A1 | 3/2014 | Scipioni |
| 2014/0074581 A1 | 3/2014 | Johnson et al. |
| 2014/0074637 A1 | 3/2014 | Hammad |
| 2014/0074655 A1 | 3/2014 | Lim et al. |
| 2014/0096202 A1 | 4/2014 | Matsuda |
| 2014/0101734 A1 | 4/2014 | Ronda et al. |
| 2014/0108260 A1 | 4/2014 | Poole et al. |
| 2014/0108263 A1 | 4/2014 | Ortiz et al. |
| 2014/0110477 A1 | 4/2014 | Hammad |
| 2014/0114780 A1 | 4/2014 | Menefee et al. |
| 2014/0122331 A1 | 5/2014 | Vaish et al. |
| 2014/0129435 A1 | 5/2014 | Pardo et al. |
| 2014/0161258 A1 | 6/2014 | Yang et al. |
| 2014/0172577 A1 | 6/2014 | Rephlo |
| 2014/0181520 A1 | 6/2014 | Wendling et al. |
| 2014/0207680 A1 | 7/2014 | Rephlo |
| 2014/0207682 A1 | 7/2014 | Wolfond et al. |
| 2014/0229377 A1 | 8/2014 | Vakklaganti |
| 2014/0263625 A1 | 9/2014 | Smets et al. |
| 2014/0279522 A1 | 9/2014 | Musser et al. |
| 2014/0324698 A1 | 10/2014 | Dolcino et al. |
| 2014/0337089 A1 | 11/2014 | Tavares |
| 2014/0337236 A1 | 11/2014 | Wong et al. |
| 2014/0339315 A1 | 11/2014 | Ko |
| 2014/0344153 A1 | 11/2014 | Raj et al. |
| 2014/0370851 A1 | 12/2014 | Wang et al. |
| 2014/0372308 A1 | 12/2014 | Sheets |
| 2015/0004934 A1 | 1/2015 | Qian et al. |
| 2015/0032569 A1 | 1/2015 | Stromberg |
| 2015/0032625 A1 | 1/2015 | Dill et al. |
| 2015/0032627 A1 | 1/2015 | Dill et al. |
| 2015/0046276 A1 | 2/2015 | Artman et al. |
| 2015/0046338 A1 | 2/2015 | Laxminarayanan et al. |
| 2015/0046339 A1 | 2/2015 | Wong et al. |
| 2015/0046340 A1 | 2/2015 | Dimmick |
| 2015/0073995 A1 | 3/2015 | Hayhow et al. |
| 2015/0081461 A1 | 3/2015 | Adrangi et al. |
| 2015/0081538 A1 | 3/2015 | Renard et al. |
| 2015/0098463 A1 | 4/2015 | Davis et al. |
| 2015/0149336 A1 | 5/2015 | Haggerty et al. |
| 2015/0156601 A1 | 6/2015 | Donnellan et al. |
| 2015/0161591 A1 | 6/2015 | Yang |
| 2015/0170137 A1 | 6/2015 | Balbus |
| 2015/0186871 A1 | 7/2015 | Laracey |
| 2015/0195133 A1 | 7/2015 | Sheets et al. |
| 2015/0248664 A1 | 9/2015 | Makhdumi et al. |
| 2015/0269565 A1 | 9/2015 | Inotay et al. |
| 2015/0348007 A1 | 12/2015 | Khan et al. |
| 2015/0356560 A1 | 12/2015 | Shastry et al. |
| 2015/0371234 A1 | 12/2015 | Huang et al. |
| 2016/0026697 A1 | 1/2016 | Rinearson et al. |
| 2016/0036790 A1 | 2/2016 | Shastry et al. |
| 2016/0078434 A1 | 3/2016 | Huxham et al. |
| 2016/0086166 A1 | 3/2016 | Pomeroy et al. |
| 2016/0086184 A1 | 3/2016 | Carpenter et al. |
| 2016/0125396 A1 | 5/2016 | Brickell et al. |
| 2016/0142174 A1* | 5/2016 | Fine ...................... H04B 17/30 |
| | | 455/1 |
| 2016/0147526 A1 | 5/2016 | Camp et al. |
| 2016/0155111 A1 | 6/2016 | Arnald et al. |
| 2016/0162883 A1 | 6/2016 | Liscia et al. |
| 2016/0173483 A1 | 6/2016 | Wong et al. |
| 2016/0180330 A1 | 6/2016 | Feldman |
| 2016/0232524 A1 | 8/2016 | Barrale et al. |
| 2016/0241402 A1 | 8/2016 | Gordon et al. |
| 2016/0247233 A1 | 8/2016 | Page |
| 2016/0253651 A1 | 9/2016 | Park et al. |
| 2016/0275492 A1 | 9/2016 | Brickell et al. |
| 2016/0292673 A1 | 10/2016 | Chandrasekaran |
| 2016/0294550 A1 | 10/2016 | French et al. |
| 2016/0307184 A1 | 10/2016 | Peyton et al. |
| 2016/0307186 A1 | 10/2016 | Noe et al. |
| 2016/0364938 A1 | 12/2016 | Miranda et al. |
| 2017/0004506 A1 | 1/2017 | Steinman et al. |
| 2017/0039557 A1 | 2/2017 | Murphy |
| 2017/0046679 A1 | 2/2017 | Gotlieb et al. |
| 2017/0063827 A1 | 3/2017 | Ricardo |
| 2017/0109745 A1 | 4/2017 | Al-Bedaiwi et al. |
| 2017/0116615 A1 | 4/2017 | Burgess et al. |
| 2017/0249132 A1 | 8/2017 | Andrews et al. |
| 2017/0262819 A1 | 9/2017 | Malhotra et al. |
| 2017/0302637 A1 | 10/2017 | Baba |
| 2017/0316493 A1 | 11/2017 | Numata |
| 2018/0012226 A1 | 1/2018 | Phillips et al. |
| 2018/0018661 A1 | 1/2018 | Murphy |
| 2018/0025349 A1 | 1/2018 | Marsh |
| 2018/0047022 A1 | 2/2018 | Schipperheijn |
| 2018/0053157 A1 | 2/2018 | Roffey |
| 2018/0089677 A1 | 3/2018 | Ali et al. |
| 2018/0101672 A1 | 4/2018 | George |
| 2018/0160255 A1 | 6/2018 | Park |
| 2018/0181978 A1 | 6/2018 | Weinberger et al. |
| 2018/0197171 A1 | 7/2018 | Steinman et al. |
| 2018/0204195 A1 | 7/2018 | Kang |
| 2018/0211248 A1 | 7/2018 | Sims et al. |
| 2018/0233001 A1 | 8/2018 | Priebatsch |
| 2018/0255460 A1 | 9/2018 | Hammad et al. |
| 2018/0270066 A1 | 9/2018 | Doyon et al. |
| 2018/0285868 A1 | 10/2018 | O'Hara et al. |
| 2018/0330375 A1 | 11/2018 | Sharma |

(56) References Cited

U.S. PATENT DOCUMENTS

| | | | |
|---|---|---|---|
| 2018/0336562 A1 | 11/2018 | Umanski et al. | |
| 2019/0001732 A1 | 1/2019 | Ongsitco | |
| 2019/0005494 A1 | 1/2019 | Hammad et al. | |
| 2019/0066113 A1 | 2/2019 | Gupta et al. | |
| 2019/0087813 A1 | 3/2019 | Wilson | |
| 2019/0087817 A1 | 3/2019 | Adari | |
| 2019/0087823 A1 | 3/2019 | Patel et al. | |
| 2019/0089705 A1 | 3/2019 | Chud et al. | |
| 2019/0109842 A1 | 4/2019 | Kumar et al. | |
| 2019/0122222 A1 | 4/2019 | Uechi | |
| 2019/0190717 A1 | 6/2019 | Beric et al. | |
| 2019/0197553 A1 | 6/2019 | Conway | |
| 2019/0238504 A1 | 8/2019 | Gupta et al. | |
| 2019/0303917 A1 | 10/2019 | Locke et al. | |
| 2019/0332912 A1 | 10/2019 | Walker | |
| 2020/0007536 A1 | 1/2020 | Piel | |
| 2020/0019725 A1 | 1/2020 | Rule et al. | |
| 2020/0034870 A1 | 1/2020 | Dao et al. | |
| 2020/0042975 A1 | 2/2020 | Gueorguiev et al. | |
| 2020/0082384 A1 | 3/2020 | Guise | |
| 2020/0104474 A1 | 4/2020 | Duane et al. | |
| 2020/0104833 A1 | 4/2020 | Rule et al. | |
| 2020/0106614 A1 | 4/2020 | Rule et al. | |
| 2020/0106615 A1 | 4/2020 | Rule et al. | |
| 2020/0106619 A1 | 4/2020 | Osborn et al. | |
| 2020/0154278 A1 | 5/2020 | Douglas et al. | |
| 2020/0184462 A1 | 6/2020 | Rule et al. | |
| 2020/0202322 A1 | 6/2020 | Tanner et al. | |
| 2020/0238952 A1* | 7/2020 | Lindsay | G06V 30/194 |
| 2020/0242588 A1 | 7/2020 | Rule et al. | |
| 2020/0242616 A1 | 7/2020 | Waughtal | |
| 2020/0302436 A1 | 9/2020 | Ilincic et al. | |
| 2020/0304311 A1* | 9/2020 | Rule | G06Q 20/405 |
| 2020/0314644 A1 | 10/2020 | Dean et al. | |
| 2020/0380483 A1 | 12/2020 | Kang | |
| 2020/0380495 A1 | 12/2020 | Kang | |
| 2021/0004786 A1* | 1/2021 | Mossler | H04L 9/3073 |
| 2021/0067316 A1 | 3/2021 | Bellenger et al. | |
| 2021/0158333 A1 | 5/2021 | Cohen et al. | |
| 2021/0272097 A1 | 9/2021 | Wen et al. | |
| 2021/0279793 A1 | 9/2021 | Leise et al. | |
| 2021/0319427 A1 | 10/2021 | Rule et al. | |
| 2021/0342809 A1 | 11/2021 | Rule et al. | |
| 2021/0342816 A1 | 11/2021 | Benkreira et al. | |
| 2021/0383381 A1 | 12/2021 | Aabye et al. | |
| 2022/0036340 A1 | 2/2022 | Hollander et al. | |
| 2022/0092589 A1 | 3/2022 | Osborn et al. | |
| 2022/0198448 A1 | 6/2022 | Ilincic et al. | |
| 2022/0300981 A1 | 9/2022 | Sharma et al. | |
| 2022/0335432 A1 | 10/2022 | Rule et al. | |
| 2022/0405741 A1 | 12/2022 | Rule et al. | |
| 2022/0407724 A1 | 12/2022 | Osborn et al. | |
| 2023/0020843 A1 | 1/2023 | Bowers et al. | |
| 2023/0021963 A1 | 1/2023 | Singhal et al. | |
| 2023/0050991 A1 | 2/2023 | Rule et al. | |
| 2023/0052901 A1 | 2/2023 | Boryk et al. | |
| 2023/0059546 A1 | 2/2023 | Huang et al. | |
| 2023/0169503 A1 | 6/2023 | Jeffrey et al. | |
| 2023/0237466 A1 | 7/2023 | Rule et al. | |
| 2023/0281594 A1 | 9/2023 | Mchugh et al. | |
| 2023/0343165 A1 | 10/2023 | Rule et al. | |
| 2023/0410087 A1 | 12/2023 | Hollander et al. | |
| 2023/0418923 A1 | 12/2023 | Ogbennah et al. | |
| 2024/0046266 A1 | 2/2024 | Rule et al. | |
| 2024/0046272 A1 | 2/2024 | Benkreira et al. | |
| 2024/0054498 A1 | 2/2024 | Sinha et al. | |
| 2024/0062206 A1 | 2/2024 | Osborn et al. | |

FOREIGN PATENT DOCUMENTS

| | | | |
|---|---|---|---|
| CN | 108075888 A | 5/2018 | |
| EP | 1 773 018 A1 | 4/2007 | |
| EP | 2 889 823 A1 | 7/2015 | |
| EP | 3 531 358 A1 | 8/2019 | |
| EP | 3 079 326 B1 | 10/2020 | |
| EP | 3 761 248 | 6/2021 | |
| GB | 2 476 989 A | 7/2011 | |
| KR | 20160064061 A | 6/2016 | |
| KR | 2018015920 A | 2/2018 | |
| KR | 20180015920 A | 2/2018 | |
| KR | 2020020442 A | 2/2020 | |
| OA | 17553 A | 2/2017 | |
| WO | WO-01/46775 A2 | 6/2001 | |
| WO | WO-2005/098737 A2 | 10/2005 | |
| WO | WO-2005/119607 A2 | 12/2005 | |
| WO | WO-2005/119608 A1 | 12/2005 | |
| WO | WO-2006/023839 A2 | 3/2006 | |
| WO | WO-2007/038896 A2 | 4/2007 | |
| WO | WO-2007/076476 A2 | 7/2007 | |
| WO | WO-2010/027331 A1 | 3/2010 | |
| WO | WO-2010/033944 A2 | 3/2010 | |
| WO | WO-2010/127244 A2 | 11/2010 | |
| WO | WO-2010/127244 A3 | 11/2010 | |
| WO | WO-2012/042262 A1 | 4/2012 | |
| WO | WO-2013/028910 A2 | 8/2012 | |
| WO | WO-2012/154915 A1 | 11/2012 | |
| WO | WO-2013/010096 A1 | 1/2013 | |
| WO | WO-2014/170668 A1 | 10/2014 | |
| WO | WO-2015/101439 A1 | 7/2015 | |
| WO | WO-2015/104387 A1 | 7/2015 | |
| WO | WO-2015/114460 A2 | 8/2015 | |
| WO | WO-2015/117451 A1 | 8/2015 | |
| WO | WO-2015/167425 A1 | 11/2015 | |
| WO | WO-2016/001867 A2 | 1/2016 | |
| WO | WO-2016/028779 A1 | 2/2016 | |
| WO | WO-2016/049745 A1 | 4/2016 | |
| WO | WO-2016/122457 A1 | 8/2016 | |
| WO | WO-2017/096399 A1 | 6/2017 | |
| WO | WO-2017/174200 A3 | 10/2017 | |
| WO | WO-2018/217106 A1 | 11/2018 | |
| WO | WO-2019/238688 A1 | 12/2019 | |
| WO | WO-2020/122898 A1 | 6/2020 | |
| WO | WO-2020/222143 A1 | 11/2020 | |

OTHER PUBLICATIONS

P. Urien, "EMV-TLS, a secure payment protocol for NFC enabled mobiles," 2014 International Conference on Collaboration Technologies and Systems (CTS), Minneapolis, MN, USA, 2014, pp. 203-210, doi: 10.1109/CTS.2014.6867565. (Year: 2014).

R. Schamberger, G. Madlmayr and T. Grechenig, "Components for an interoperable NFC mobile payment ecosystem," 2013 5th International Workshop on Near Field Communication (NFC), Zurich, Switzerland, 2013, pp. 1-5, doi: 10.1109/NFC.2013.6482440. (Year: 2013).

Triggs, R., "All you need to know about NFC Tags", 2018, Android Authority (2 Pages).

Borchert, B.; Gunther, M.;Indirect NFC-Login on a Non-NFC Device using an NFC-Smartphone; international Journal of Intelligent Computing Research; vol. 4, Iss. 4, Dec. 2013; 7 Pages.

FIDO Alliance. Open Authentication Standards More Secure than Passwords. fidoalliance. org. Accessed Jul. 23, 2019.

Java Tutorials, "What Is a Network Interface?," http://docs.oracle.com, all pages. (Year: 2012).

Kadambi et al., "Near-Field Communication-Based Secure Mobile Payment Service", Proceedings of the 11th International Conference on Electronic Commerce, ACM, 2009.

Liao, Shannon. "Google will not let you use your Android phone as a physical security key." www.theverge.com/2019/4/10/18295348/google-android-phone-fido-webauthn-phishing-two-factor-authentication. Apr. 10, 2019. Accessed Jul. 23, 2019.

Liao, Shannon. "Google will now let you use your Android phone as a physical security key." www.theverge.com/2019/4/10/18295348/google-android-phone-fido-webauthn-phishing-two-factor-authentication., Apr. 10, 2019. Accessed Jul. 23, 2019.

Poroye, Adeola Oluwaseyi. "Secure contactless mobile financial services with Near Field Communication", Diss. University of the Western Cape, 2011. Located via Google Scholar, http://etd.uwc.ac.za/bitstream/handle/11394/1752/Poroye_MSC_2011.pdf?sequence=1.

(56) References Cited

OTHER PUBLICATIONS

Robert Triggs ("All you need to know about NFC Tags", Android Authority, Aug. 29, 2018) (Year: 2018).

Robert Triggs, "All you need to know about NFC Tags", Android Authority, Aug. 29, 2018, p. 2 (Year: 2018).

Russell, "3 Reasons Why Tap and Pay (NFC) is Awesome", Jun. 9, 2018, Helcim Articles (Year: 2018).

Russell, 3 Reasons Why 1 ap and Pay (NFC) Is Awesome, Jun. 9, 2018, Heicim Articles (Year 2018).

Triggs, R., "All You Need to Know About NFC Tags," Android Authority, Aug. 29, 2018, 6 pages.

Wong, Wen Teng. "Security of NFC payment on mobile payment application", Diss. UTAR, 2018. Located via Google Scholar, http://eprints.utar.edu.my/3050/1/fyp_CS_2018_WWT_-_1403709.pdf.

Yang, "Security Enhanced EMV-Based Mobile Payment Protocol", Hindawi Publishing Corporation, the Scientific World Journal, vol. 214, Article ID 864571, 2014, 19 pages.

* cited by examiner

200

201 — Receive new contactless card application

202 — Issue new contactless card

203 — Activate new contactless card

400

401

Receive information via a card placed adjacent to customer device

402

Respond to information received from the card

403

Authenticate a customer associated with the card

404

Provide a response based on the authentication

700

102

702

750

102

752

754

Browser

Congratulations! Your card is available for immediate use

1200

1254

102

1250

Browser

Additional Authentication Information

Other Options

1235

Please scan your fingerprint

1252

1251

Cancel

1253

SYSTEMS AND METHODS FOR A TRANSACTION CARD HAVING A CRYPTOGRAPHIC KEY

CROSS REFERENCE TO RELATED APPLICATIONS

This application is a continuation of U.S. patent application Ser. No. 18/117,654, titled "Systems and Methods for a Transaction Card Having a Cryptographic Key," filed Mar. 6, 2023, which is a continuation of U.S. patent application Ser. No. 16/703,513, titled "Systems and Methods for a Transaction Card Having a Cryptographic Key," filed Dec. 4, 2019, which claims the benefit of and priority to U.S. Provisional Patent Application No. 62/902,247 entitled "Systems and Methods For Contactless Card Activation, Usage, and Account Access," filed Sep. 18, 2019, all of which are incorporated herein by reference in their entireties.

TECHNICAL FIELD

Embodiments of the present disclosure relate to systems and methods for providing and using a contactless transaction card.

BACKGROUND

Financial institutions such as banks and other card issuers typically offer customers a variety of transaction cards (e.g., credit card, debit card, rewards card, etc.). A corresponding account for the transaction card is also created and provided by the institution. As a security measure, new transaction cards are typically issued to customers in an inactive state (i.e., unable to perform transactions). In operation, the transaction card may be provided to the customer and the customer is then expected to activate the card via, for example, calling an activation telephone line. Once activated, the transaction card may be used in a variety of transactions (e.g., to pay for goods or services). But, accessing the corresponding account of the transaction card may be difficult. In this regard, setting up and accessing online accounts associated with the card is usually a long and cumbersome process. Further, even activating the card may be cumbersome due to users' unwillingness to make the telephone call. Improvements are desired.

SUMMARY

One embodiment relates to a method of issuing and activating a transaction card. The method includes receiving, by a transaction card processing circuit, a transaction card application for a contactless transaction card from an applicant; issuing, by the transaction card processing circuit, a contactless transaction card based on the transaction card application, wherein the contactless transaction card comprises a uniform resource locator (URL) embedded thereon; and activating, by the transaction card processing circuit, the contactless transaction card in response to receiving information from a contactless communication between the contactless transaction card and a customer device, wherein the contactless communication causes access to a web site associated with the URL.

Another embodiment relates to a method of activating a transaction card. The method includes receiving, via a contactless communication by a mobile device from the transaction card, information embedded on the transaction card comprising a uniform resource locator (URL); responding, by the mobile device, to the received information by automatically displaying a web page associated with the URL; and providing, by the mobile device, an indication of an activation of the transaction card.

Still another embodiment relates to a system. The system includes a processor and a memory storing instructions that, when executed by the processor, cause various operations. The operations include: receive a transaction card application for a contactless transaction card from an applicant; issue the contactless transaction card based on the transaction card application, wherein the contactless transaction card comprises a uniform resource locator (URL) embedded thereon; and activate the contactless transaction card in response to receiving information from a contactless communication between the contactless transaction card and a customer device, wherein the contactless communication causes access to a web page associated with the URL for automatically activating the contactless transaction card.

Yet another embodiment relates to a contactless card system. The contactless card system may be configured to activate a transaction card. The contactless card system may include a contactless card, a customer device, and a card issuer computing system. The customer device includes wireless chip and a processor. The wireless chip communicates with a contactless enabled chip on the contactless card in order to receive information stored on the contactless enabled chip in response to the contactless card being placed in close proximity to the wireless chip. The information stored on the contactless enabled chip includes a NFC tag, which signifies that the tag is transmitted via NFC. In some embodiments, the NFC tag includes a general URL embedded therein. In other embodiments, the NFC tag includes a customer specific URL embedded therein. In some embodiments, the NFC tag includes a password or other customer information embedded therein. The card issuer computing system includes an accounts database and a transaction card processing circuit. The transaction card processing circuit controls the approval or denial of transactions made with transaction cards. The transaction card processing circuit may also activate a transaction card. In one embodiment, activation occurs in response to receiving information from a mobile device after the mobile device was "tapped" (i.e., a contactless communication occurs) with the transaction card.

Still another embodiment relates to a transaction card. The transaction card includes a contactless enabled chip having a customer-specific uniform resource locator (URL) stored thereon. The contactless enabled chip is configured to communicate the customer-specific URL to a mobile device via a contactless communication to activate the transaction card for use in a subsequent transaction (e.g., a payment for a good or service). Beneficially, this activation protocol avoids the user having to either call an activation line or provide excessive amounts of information online, which may streamline activation of the transaction card.

Yet another embodiment relates to a method. The method includes receiving, via a contactless communication by a customer device from a transaction card, information from the transaction card, wherein the information comprises a customer-specific uniform resource locator (URL); and responding, by the customer device, to the customer-specific URL by displaying a website associated with the customer-specific URL in order to activate the transaction card.

A further embodiment relates to a non-transitory computer-readable medium storing instructions that, when executed by one or more processors cause various operations. The operations include: activating a near field communication (NFC) tag on a transaction card; receiving, via a contactless communication, information embedded in the NFC tag, the information comprising a customer-specific uniform resource locator (URL); and causing a display of a website associated with the customer-specific URL, wherein the display includes an indication of an activation of the transaction card.

Still a further embodiment relates to a method of accessing an account. The method includes: receiving, by a transaction card processing circuit from a customer device, information regarding the customer device and information regarding a contactless card associated with the account, wherein the information is received by the customer device via a contactless communication with the contactless card; authenticating, by the transaction card processing circuit, a customer associated with the contactless card based on the information regarding the customer device and the information regarding the contactless card; and providing, by the transaction card processing circuit, access to the account by the customer device based on the authentication.

Yet a further embodiment relates to a method of accessing an account. The method includes: wirelessly receiving, via a contactless communication by a mobile device from a transaction card, information stored on the transaction card; responding, by the mobile device, to the information stored on the transaction card; receiving, by the mobile device, an indication of an authentication of a customer associated with the transaction card; and providing, via a graphical user interface of the mobile device, access to the account in response to receiving the indication of the authentication of the customer.

Another embodiment relates to a system. The system includes a processor and a memory storing instructions that, when executed by the processor, cause various operations. The operations include: receive, via a contactless communication from a customer device, information regarding the customer device and information regarding a contactless card associated with an account associated with the contactless card; authenticate a customer associated with the contactless card based on the information regarding the customer device and the information from the contactless card; and provide access to the account by the customer device based on the authentication.

Another embodiment relates to a transaction card having a contactless enabled chip that has payment information and identity information stored thereon. The contactless enabled chip is configured to communicate the identity information to a mobile device via a contactless communication, and the identity information including a cryptographic key, cryptographic token, or a digital certificate.

A further embodiment relates to a method. The method includes receiving, by a transaction card processing circuit from a customer device, information regarding a contactless card associated with the based on a contactless communication between the contactless card and the customer device, identifying, by the transaction card processing circuit, a customer associated with the contactless card based on the information regarding the contactless card, and providing, by the transaction card processing circuit to the customer device, access to the account in response to identifying the customer.

Yet a further embodiment relates to a method of accessing an account. The method includes wirelessly receiving, via a contactless communication by a mobile device from a transaction card in response to transmitting a command, a tag comprising a cryptographic key, a cryptographic token, or a digital certificate that is unique to a customer associated with the transaction card, responding, by the mobile device, to the tag by using the information received in the tag to transmit identity information to a transaction card processing circuit, receiving, by the mobile device from the transaction card processing circuit, an indication of an authentication of a customer associated with the transaction card based at least on the tag, and providing, via a graphical user interface of the mobile device, access to at least a portion of the account in response to receiving the indication of the authentication of the customer.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
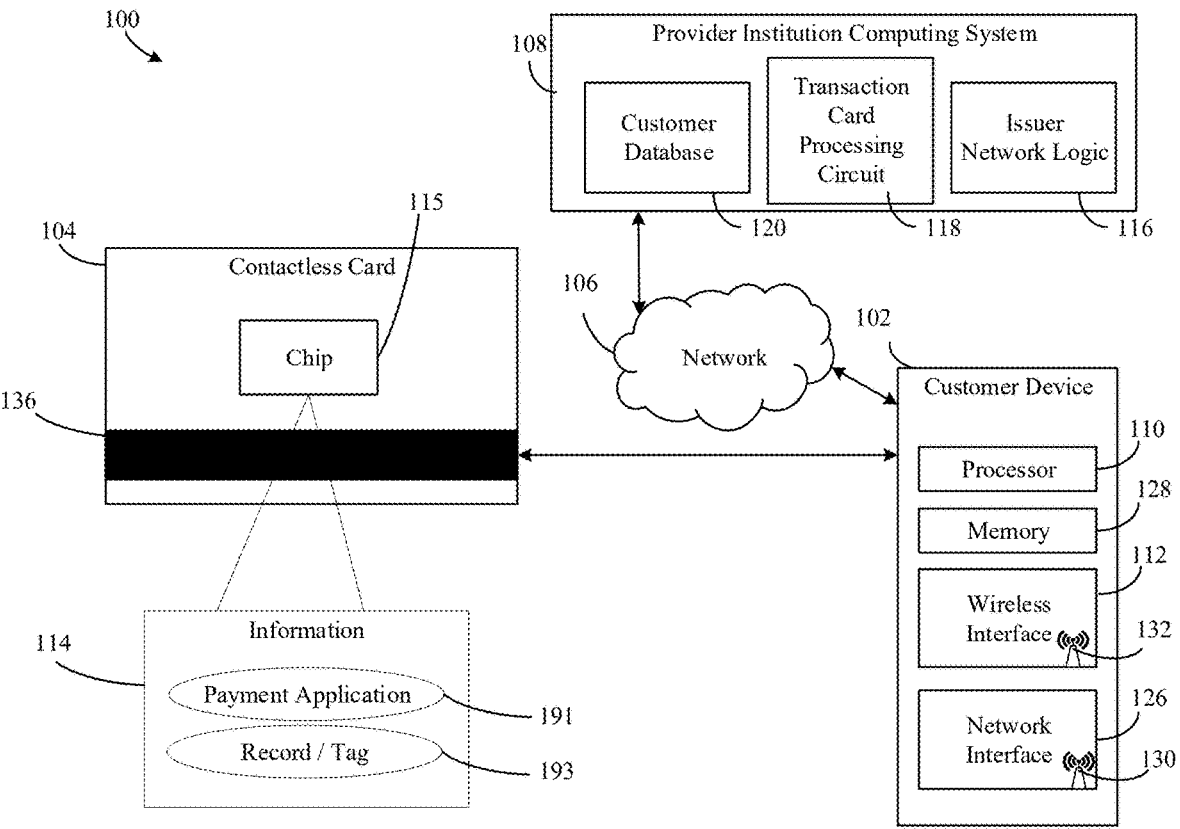
FIG. 1 is a block diagram of a contactless card system, according to an example embodiment.

Systems, apparatuses, and methods for providing and operating a contactless card system are disclosed according to various embodiments herein. A "contactless card" (also referred to as a "smart card") is a physical transaction card (e.g., formed of plastic, metal, a combination thereof, etc.)

comprising an integrated circuit with a wireless transmission antenna that allows the card to wirelessly transmit information to a contactless receiver, such as certain point of sale (POS) terminals. The contactless card may be a credit card, a debit card, or the like. The wireless transmission may be a radio field transmission and, particularly, is a near-field communication (NFC). When used in a payment transaction, the information transmitted may relate to an account associated with the contactless card (e.g., a payment account number such as a credit card account number). The circuit may store and process information relating to the transaction. In operation, the contactless card may be "tapped" (i.e., brought into a contact or near contact situation) with the contactless reader (e.g., the POS) to enable the exchange of information from the card to the contactless reader. The contactless card may also include other features such as a magnetic stripe. Additionally, the chip of the contactless card may be structured to additionally enables the card to be dipped (i.e., inserted) into a reader.

According to the present disclosure, the contactless card may have a website uniform resource locator (URL) embedded in a chip or circuit of the card. In particular, the website URL may be embedded in a record or tag on a contactless enabled chip of the card. The contactless chip is NFC enabled. When a user/customer taps the contactless card against a contactless reader (particularly, a wireless interface reader on a mobile device), the contactless circuit is activated by the mobile device to enable transmission of the tag via NFC to the mobile device where the tag/record is read. Reading of the tag causes a web browser application on the mobile device to activate and take the user to the particular website URL. At which point, the user may attempt to activate the card if the card is not yet activated. In one embodiment, the website URL is unique to the card and customer (i.e., a customer-specific URL). In this regard, each card will have a different URL that is specific to the customer. Such an arrangement will ensure that only the intended recipient of the card will be able to activate the card and/or access information regarding the account associated with the card. In other alternate embodiments, the website URL may be generic and not specific to the customer/user. In this situation, additional account information must be manually entered by the user before activation of the card or information regarding the account is provided. Beneficially, a card issuer computing system may manage transactions and activation of the contactless card with improved forms of verifying that the customer is indeed in possession of the contactless card. Thus, the systems and methods described herein provided a mitigation of potential fraud while also reducing the struggle or friction of a customer receiving and managing a contactless card (i.e., activating their card or accessing access information regarding the account associated with the card).

As used herein, the term "tap" or "tapped" as used to describe the interaction between a contactless card and a contactless reader refers to the two devices coming into a contact or near contact situation with each other such that a wireless transmission of information is possible (e.g., from the card to the customer device). Based on the wireless transmission protocol used, the distance required for the wireless transmission may vary (e.g., Bluetooth versus NFC). For example and with reference to NFC, the devices are brought to a distance of approximately 10 cm or less of each other. However, a Bluetooth transmission protocol may allow a bigger distance between the devices. Accordingly, the "tap" as described herein means a NFC communication unless otherwise specified. As also used herein, the term "authentication" generally refers to the identification of a transaction by the contactless card based on identifying the user of the card to ensure that only allowed users of the card are permitted to use the card. "Authorization" refers to approving the transaction based on the authentication. As also used herein, the term "activation" as used in reference to a state of the contactless card refers to the state of the account associated with the contactless card. When deactivated or in an inactive state, the account associated with the card is not allowed to complete a transaction. When activated, the account associated with the card may be used in various transactions, such as a payment transaction. Thus, even when deactivated, transactions involving the contactless card may be attempted (e.g., a card swipe or dip). However, these transactions are denied because the account associated with the card is not activated.

Referring now to FIG. 1, a contactless card system 100 is shown according to an example embodiment. The system 100 includes a customer device 102 associated with a customer/user, a contactless card 104, a network 106, and a provider institution computing system 108. The network 106 may be any type of type of network. For example, the network 106 may be a wireless network interface (e.g., Internet, WI-FI, etc.), a wired network interface (e.g., Ethernet), or any combination thereof. While the network 106 generally refers to the definition provided above, in some embodiments, the network 106 also includes financial networks associated with various payment brands (e.g., card networks such as Visa, American Express, Discover, MasterCard, etc.). When the network 106 is used to refer to these types of networks, the term "card network" or "payment network" is used herein. Otherwise, the aforementioned definition for the network 106 is intended. The network 106 is structured to permit the exchange of data, values, instructions, messages, and the like between and among various components of FIG. 1.

The customer device 102 is owned by or otherwise associated with a customer/user. The user may be an individual, business representative, large and small business owner, and so on. The user or customer may be an existing or a new customer to the provider institution associated with the provider institution computing system 108. The customer device 102 is structured to enable the user to access the network 106 (e.g., to send and receive information/data over the network). The customer device 102 is also structured as a contactless reader structured to enable the reception of information wirelessly from the contactless card 104. Examples of the customer device 102 include a mobile device, such as a mobile phone such as a smartphone, a tablet, a wearable computing device (e.g., eyewear), a laptop etc. In the example shown, the customer device 102 is structured as a mobile device. In other embodiments, the customer device 102 may be a different computing device, such as a desktop computer or an ATM. In the example shown, the customer device 102 includes a processor 110, memory 128, a wireless chip or interface 112, and a network interface 126. Thus, the customer device 102 includes two interfaces: interface 112 that is structured to enable communications with the contactless card 104, and network interface 126 that enables communications over the network 106.

The customer device 102 may include program logic (e.g., instructions) stored by the memory 128 and executable by the processor 110 to implement at least some of the functions described herein. The processor 110 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 128 (e.g., RAM, NVRAM, ROM, Flash Memory, hard disk storage, etc.) may store data and/or computer code for facilitating the various processes described herein. Moreover, the one or more memory devices 128 may be or include tangible, non-transient volatile memory or non-volatile memory. Accordingly, the one or more memory devices 128 may include database components, object code components, script components, or any other type of information structure for supporting the various activities and information structures described herein.

In some embodiments, the processor 110 may be configured to download and execute a software application of the customer device 102. For example, a developer may make or create the software application to be downloaded (e.g., via the developer's website, via an app store, or in another manner). Responsive to a customer selection of an appropriate link, the software application can be transmitted to the customer device 102 and cause itself to be installed on the customer device 102. Installation of the software application creates a customer application that is executable by the processor 110. Examples of downloadable applications include a mobile banking application, a mobile wallet application, and so on. The processor 110 is also structured to execute thick client applications as well (e.g., via a web browser). In either situation, the execution of the application (either thick, thin, or smart client application) may enable the user to access one or more accounts of the customer (e.g., provided and maintained by the card issuer). Or, more generally, execution of the application allows functions associated with that application. In operation, the processor 110 is structured to automatically launch an application (e.g., a web browser) in response to receiving embedded data (e.g., a URL embedded in a record or tag accessible via the interface 112) as a result of a contact or near-contact engagement with the contactless card 104 (e.g., an NFC communication).

The network interface 126 may include one or more antennas 132 and associated communications hardware and logic. The network interface 126 is structured to allow the processor 110 to access and connect to the network 106 to, in turn, exchange information with for example the provider institution computing system 108. That is, the network interface 126 is coupled to the processor 110 and memory 128 and configured to enable a coupling to the network 106. The network interface 126 allows for the customer device 102 to transmit and receive internet data and telecommunication data. Accordingly, the network interface 126 includes any one or more of a cellular transceiver (e.g., CDMA, GSM, LTE, etc.), a wireless network transceiver (e.g., 802.11X, ZigBee, WI-FI, Internet, etc.), and a combination thereof (e.g., both a cellular transceiver).

The customer device 102 further includes wireless chip 112. The wireless chip 112 includes a radio frequency (RF) antenna 130. The wireless chip 112 (also referred to as a wireless interface 112) is structured to enable other non-network communications. In particular, the wireless interface 112 is structured to enable relatively short distance wireless communications with other devices. In the example shown, the wireless chip 112 is a NFC interface (e.g., NFC transceiver) coupled to the processor 110 and configured to transmit and receive data. The wireless chip 112 includes hardware and associated logic structured to enable the customer device 102 to wirelessly and securely exchange data over short distances. In some arrangements, the wireless chip 112 is configured to use radio frequency identification (RFID) to exchange digital information.

In certain arrangements, the network interface 126 and/or wireless interface 112 may include cryptography capabilities to establish a secure or relatively secure communication session with the at least the provider institution computing system 108 or the contactless card 104. In this regard, data may be encrypted to prevent or substantially prevent the threat of hacking.

It should be understood that the customer device 102 may include other structures with associated functionality as well. For example, the customer device 102 may include a global positioning system (GPS) structured to at least one of determine or receive data indicative of the location of the customer device 102. This "location data" may provide an indication of a location of the customer device 102. In certain embodiments, location data may be used as part of an authentication process for activation of the contactless card and/or password-less login.

Still referring to FIG. 1, the contactless card 104 (or, smart card) is a transaction card associated with the user or customer. The contactless card 104 is associated with an account of the user. In one embodiment, the transaction card is a payment card associated with a charge account (e.g., a line of credit, a checking account, a prepaid account, and the like). In another embodiment, the contactless card 104 is a non-payment card that is associated with an account of the user (e.g., a loyalty card). In the example shown, the contactless card is a credit card. But, as alluded to above, the contactless card 104 may be any type of transaction card such as a rewards card, a loyalty card, etc. such that the disclosure provided herein is also applicable with these card configurations.

In the example shown, the card 104 includes a magnetic stripe 136, and a chip 115. Because the chip 115 is structured to allow contactless communications, the chip or interface 115 may also be referred to herein as a "contactless enabled chip." In some embodiments, the contactless enabled chip 115 may be a dual interface chip that has the same or similar structure as a dual interface EMV chip. The "dual interface" characteristic means that the contactless enabled chip 115 is enabled to transmit information in a contactless manner and in a contact manner. For example, the chip may transmit information on the card (e.g., such as the record containing the URL) via near-field communication (NFC) (i.e., a contactless manner) and also have the physical contacts that allow for the card to be dipped into a reader (i.e., a contact manner). Thus, there is one chip—chip 115—that is structured for contactless and contact transactions. As mentioned above, the chip 115 may be an EMV chip. In other embodiments, the chip 115 may only be capable of performing contact or contactless transactions. As described herein, the chip 115 of the contactless card 104 is structured to enable contactless transactions. The magnetic stripe 136 is structured to transmit payment data when swiped through a magnetic stripe reader. In some embodiments, the magnetic stripe may be omitted from the card 104. The contactless card 104 may also include visible information on the face and/or back of the card and digital information stored within the various structures of the contactless card 104. For example, the contactless card 104 can include a customer's name, a transaction card account number, an expiration date, and the like that is printed or embossed on the physical card. The contactless card 104 may also include more detailed identifying customer information (e.g., a customer identification number from the issuer) and account information (e.g., account numbers, information regarding the card issuer, expiration date, and so on) in the magnetic stripe 136, or an onboard the contactless enabled chip 115.

The contactless enabled chip 115 (or, contactless interface or transceiver) is a defining feature of the "contactless" aspect of the contactless card 104. The contactless enabled chip 115 is a small circuitry system configured to wirelessly exchange data with a contactless reader. For example, the contactless enabled chip 115 can exchange data via RFID. In the example shown, the contactless enabled chip 115 is structured to enable a NFC communication. Thus, in the example shown, the contactless enabled chip 115 includes a NFC transceiver. In other alternate embodiments, the contactless enabled chip 115 may enable a different short-distance communication form, such as a Bluetooth transmission. Accordingly, in these embodiments, the contactless enabled chip 115 may include the relevant associated structures (e.g., a Bluetooth antenna).

The contactless enabled chip 115 is configured to selectively store and transmit various types of information 114. As shown, the information 114 includes a payment application 191 and a record 193. The payment application 191 stores data and programs structured to enable a payment via the card 104. Examples of such payment application 191 data and programs may include, but are not limited to, terminal risk management data, card risk management data, issuer application data, secret data such as keys, or customer exclusive data.

The record or tag 193 (the terms "record" and "tag" are used interchangeably herein) is structured as a file that is stored in the contactless enabled chip 115. In particular, the record or tag 193 is structured as a text file that stores information that may include a general website URL, a customer specific website URL, a password, and/or instructions to perform an operation. As described herein, the record or tag 193 is accessed via the contactless interface 112 on the customer device 102. The record 193 is separate from the payment application 191. In this regard, POS terminals are not configured to access/use the record 193. The contactless enabled chip 115 may also have transaction card information embedded within the tag 193, such as account numbers, proxy account numbers, payment tokens, issuing entities, expiration date, and so on.

In this regard, the contactless enabled chip 115 may have or store information that includes identifying customer information. In some arrangements, one or more pieces of information may be transmitted as a token, such as the information stored in the record 193. For example, the account number associated with the card may be tokenized to obscure the actual account number. The token, when received by the card issuer computing system 108 via a payment network, can be cross referenced against a token vault to identify the actual payment information (e.g., the actual account number associated with the customer). Other pieces of information may also be tokenized in order to obscure sensitive or relatively sensitive data.

The contactless enabled chip 115 may also be structured to store and transmit specific instructions. The specific instructions may be stored in the record 193. The specific instructions may direct a device (e.g., customer device 102) to do or perform one or more functions. For example, the instructions may cause the device 102 to access a web browser application and be directed to a particular website. In some embodiments, the specific instructions include an instruction to direct a device to a specific website associated with a URL embedded on or stored by the contactless enabled chip 115. In some embodiments, the contactless enabled chip 115 includes instructions to populate fields with specific information stored by the contactless card 104. According to the present disclosure, a passive NFC tag is stored by the contactless enabled chip 115. The passive NFC tag refers to the information stored in the record 193 being communicated via NFC transmission. It is considered "passive" because a contactless reader is needed to power the chip 115 to cause the wireless transmission of the tag 193 to the customer device 102. The passive NFC tag includes an instruction that is transmitted to the customer device in response to the wireless interface 112 activating the contactless enabled chip 115. The passive NFC tag may include information about a specific customer's online login information, instructions to pre-populate fields within a website with transaction card identification, etc. Thus, the contactless enabled chip 115 using the passive NFC tag is structured to at least partly control certain functions of the customer device 102.

The contactless enabled chip 115 may store information regarding a general website, a customer specific website (e.g., via an embedded URL), or online login information for the account associated with the card 104. The chip 115 is structured to transmit the information in response to a request or general communication with the contactless enabled interface 112 of the device 102.

Regarding the general website feature, for example, the contactless enabled chip 115 may have a general website embedded thereon. This structure may be in the form of a link to a website that is publicly available and not specific to a person or group. The general website URL may be embedded in the tag 193 (which is, particularly, a passive NFC tag) of the contactless enabled chip 115 such that when the wireless interface 112 interacts with the contactless enabled chip 115, the general URL gets transmitted to the customer device 102 for accessing. In addition to the general website URL, an instruction to activate a browser application of the customer device 102 may also be included with the tag 193. This instruction (e.g., an API, etc.) causes activation of a website browser. The precise website browser that is activated may be based on a default setting in the customer device 102. In another embodiment, the instruction may be specific to particular website browsers (e.g., Google Chrome only). In any event, in addition to activating the web browser, the instruction directs the browser to go to the general website URL. The general website may be an online login portal where the user may be required to enter their credentials in order to access their online accounts or, specifically, the account associated with the card 104. When the card 104 is not yet active, the general web site URL is a general activation page where the user may enter identifying and verification information in order to activate the contactless card 104 for use.

In contrast to the general website example, the contactless enabled chip 115 may alternatively have a customer specific URL embedded thereon. The customer specific URL may be embedded in the tag 193 (which is, particularly, a passive NFC tag). In this regard, when the wireless interface 112 interacts with the contactless enabled chip 115, the customer specific URL gets transmitted to for access by the customer device 102. As compared the general website URL, the customer specific URL is unique to the customer and the contactless card 104. Thus, in this embodiment, each card that is issued for each customer incudes a different, unique website URL that is specific to the particular customer and card. Further, the customer specific URL may be limited in usage. In particular and in one embodiment, the customer specific URL is valid for only a one-time use. In other embodiments, the validity may last for a different predefined number of uses (e.g., two-uses, three-uses, etc.). In this example, the one-time customer specific URL may be available for activating the customer account associated with the contactless card 104 initially after receipt of the contactless card 104 by the user. By limiting the validity of the customer-specific URL, the customer-specific URL may be deactivated after the webpage is accessed. Beneficially, this feature prevents (i) continued access to a website that may allow account access which may thwart potential fraudsters, and (ii) enables that specific URL to be reused or recycled for later subsequent cards thereby decreasing the processing requirements of generating different customer specific URLs for thousands or millions of customers.

As indicated above, the customer specific URL stored in the tag 193 may direct a web browser to a unique online web portal associated with the specific user, so that the user may access an account associated with the contactless card 104 and specific to the customer. In this example, the provider institution computing system 108 may recognize the customer device 102 and the contactless card 104 and allow for immediate access to the customer's online account. Alternatively or additionally, based on the customer specific URL, the card may then be automatically activated without requiring any additional information regarding the customer or card. In this regard, the specific website unique to the customer and/or the contactless card 104 may direct a web browser to an activation website unique to the contactless card 104. As such, less identification information may be needed in order to activate the contactless card 104. Further, the customer specific URL may direct a web browser of the customer device 102 to register the customer device 102 with the contactless card 104. In this example, the provider institution computing system 108 may store information regarding the customer device 102 in a customer profile within the customer database 120 associated with the customer and contactless card 104. In this way and after activation, the provider institution computing system 108 may allow for future immediate access to online accounts associated with the contactless card 104 via the customer device (i.e., password-less login). This results in reduced friction for customers accessing online accounts and activating their card while also bolstering security through the use of both the customer device 102 and the contactless card 104.

As indicated and alluded to above, the customer specific URL may be dynamic in nature. In this regard and in the situation where the customer does not have a computer application associated with the card issuer/provider institution installed on their mobile device, the URL takes the customer to a web site or page to activate their card. The customer then enters additional information (e.g., their PIN) to complete the authentication. This may be used in co-branding situations: the provider institution has a co-branding arrangement with a merchant. The customer may think they just have the merchant's contactless card and is not aware that they have any sort of relationship with the provider institution. Thus, the customer is verified/authenticated based on the additional information entered in combination with the card and phone data being recognized by the system 108. In another scenario, the URL takes the customer to a page to login to mobile banking (i.e., the provider institution application). Here, there is no need to provide further authentication because the customer has already unlocked their phone that is recognized (Factor #1), and the customer is in possession of their card (Factor #2). There is a two-factor authentication/verification of the customer so that the card can be activated.

The contactless enabled chip 115 may also have a password embedded thereon. The password may be embedded in the tag 193 of the contactless enabled chip 115 such that when the wireless interface 112 interacts with the contactless enabled chip 115, the password gets accessed by the customer device 102. The customer device 102 may then prompt the user to enter the password (e.g., a PIN, a biometric such as fingerprint, voice print, face print, etc.). If the customer enters the right password, then access to the account associated with the card may be permitted. In some embodiments, the password may be provided via email, mail, etc. to the customer. In one example, the password is received by the customer device 102 and populated into a field on either a web browser or a mobile application associated with the provider institution. A check may then be implemented by the provider institution computing system 108 to ensure the provided password matches the password received from the contactless enabled chip. In this way, the password may provide a layer of authentication because it requires the customer to have possession of the customer device 102 that may be associated with the account associated with the card 104. Thus, the customer device 102 may be registered with the account before the user receives the card 104 such that the device 102 may receive the passcode or password instantly or nearly instantly from the provider computing system 108 upon new account sign-up or registration. That way, if the card that is received by the customer does not include a matching passcode or password, registration and activation (or, account access) is denied.

In some embodiments, the chip may include a cryptographic token, cryptographic key, digital certificate, or encryption algorithm that is profiled to the user. In this situation, the chip may not include a username and/or password of the user. Rather, the stored information (e.g., token, etc.) is the authentication mechanism for the user. This stored information will authenticate and identify the user during each tap (e.g., account access situation). The cryptographic token, cryptographic key, digital certificate, or encryption algorithm may change in response to being accessed or transmitted to a customer device 102 during a tap. The cryptographic token, cryptographic key, digital certificate, or encryption algorithm may serve as identification information. Beneficially, this format provides a layer of security by obfuscating the information from people who may unintentionally or intentionally intercept the token or key. The cryptographic token, etc. may be used to identify and authenticate the user such that the user, via the customer device, is granted access to some or all of their account information. For example, in some embodiments, the cryptographic key (e.g., token, etc.) may be embedded in the tag 193 of the contactless enabled chip 115 such that when the wireless interface 112 interacts with the contactless enabled chip 115, the cryptographic key (e.g., token, etc.) gets accessed by the customer device 102. That is, the customer device 102 receives the cryptographic key (e.g., token, etc.). In some embodiments, the customer device 102 may perform an algorithm (e.g., a decryption algorithm) on the cryptographic key (e.g., or token, etc.) in order to identify the user. In some embodiments, the customer device 102 may transmit, via the network, the cryptographic key (e.g., or token) to the provider institution computing system 108 in response to accessing the cryptographic key (e.g., or token, etc.). That is, the customer device 102 may use to cryptographic key (e.g., or token, etc.) in an attempt to access and request data (e.g., data regarding the user's account) from the provider institution computing system 108. The provider institution computing system 108, in response to receiving the cryptographic key (e.g., or token, etc.), may use the cryptographic key (e.g., or token, etc.) to identify the user associated with the cryptographic key (e.g., or token). In some embodiments, the provider institution computing system 108 performs a decryption algorithm with the cryptographic key (e.g., or token) and uses the decrypted key in order to determine (e.g., find or identify) a customer in the customer database 120 that is associated with the cryptographic key (e.g., or token, etc.). In this way, the cryptographic key (e.g., or token, etc.) can be used to identify the user. Further, the provider institution computing system 108 may authenticate the user and allow access to account information associated with the user. For example, the user may be authenticated if the provider institution computing system 108 determines that information received from the customer device 102 that identifies the customer device 102 (e.g., a media access control identification number of the customer device 102) is registered and associated with the identified user within the customer database 120. If the provider institution computing system 108 cannot authenticate the user based on the information received from the customer device 102, the provider institution computing system 108 may send instructions to the customer device 102 that cause the customer device 102 to display a prompt for additional authentication information. In some embodiments, the additional authentication information may be a personal identification number (PIN), a voiceprint, a fingerprint, a face print or other biometric data of the user. The customer device 102 may receive the additional authentication information from the user, and in response, transmit the additional authentication information to the provider institution computing system 108. The provider institution computing system 108 may use the identification information (e.g., token, etc.) and additional authentication information (e.g., the PIN) to authenticate the user and allow the customer device 102 to access and display some or all of the user's account information. In some embodiments, the provider institution computing system 108 authenticates the user via cross referencing the additional authentication information with stored information regarding the user within the customer database 120. The provider institution computing system 108 may, in response to authenticating the user, allow the customer device 102 to access and display all or part of the user's account.

The provider institution computing system 108 may be owned by or otherwise associated with a provider institution. The provider institution may be a financial institution, such as commercial or private banks, credit unions, investment brokerages, and so on. The provider institution can also include any commercial entity capable of maintaining charge accounts, including retailers, vendors, service providers, and the like. In the example shown, the provider institution is an issuer of the contactless card 104. Accordingly, the provider institution and associated provider institution computing system may also be referred to herein as the card issuer and card issuer computing system 108 herein. The card issuer computing system 108 is configured to manage charge accounts and authorize transactions involving debits from charge accounts associated with existing customers.

The card issuer computing system 108 includes an issuer network logic 116, a transaction card processing circuit 118, and a customer database 120. The issuer network logic 116 is structured to enable the card issuer computing system 108 to connect to and to exchange information over the network 106 with, for example, the customer device 102. The issuer network logic 116 may include a network interface structured to send and receive data over the network 106.

The customer database 120 is structured as a repository for information. In this regard, the customer database 120 is configured to store, hold, and maintain information for a plurality of customers of the provider institution. For example, the database 120 may store information for customers with issued cards (e.g., card 104), including for example, personal customer information (e.g., names, addresses, phone numbers, and so on) and financial information (e.g., associated financial institutions, account numbers, available credit, credit history, and so on). The information contained in the customer database 120 may be used by the card issuer computing system 108 to perform a variety of checks surrounding a given contactless card, including for example, confirming identifying customer information, determining a customer's transaction history, determining a customer's available credit, and so on.

The transaction card processing circuit 118 is structured to process or facilitate processing of transactions by the card 104. The transaction card processing circuit 118 is structured to receive a transaction card authentication request from a website or customer device 102 over the network 106 (or, via other communication means). The authentication request may include a token and a cryptogram. The token may be used to obscure sensitive data regarding at least one of the card 104, the account associated with the card, the customer device 102, or the customer. The cryptogram may be generated by the customer device 102 after the tap with the card 104. The cryptogram may serve as an additional layer of security for at least one of a password-less login to an account associated with the card or an activation of the card 104.

The transaction card processing circuit 118 may be embodied as a processing circuit having one or more processors coupled to one or more memory devices. Thus, the transaction card processing circuit 118 may have the structure described herein. As alluded to above, the transaction card processing circuit 118 is structured to process transaction card applications, issue and activate transaction cards, approve transactions, approve entry into web-based accounts, and/or general respond to information and requests received by the card issuer computing system 108. In some embodiments, the transaction card processing circuit 118 may include or utilize multiple processors throughout the card issuer computing system 108.

Figure 2:
FIG. 2 is a flow diagram of a method of issuing and activating a new contactless card, according to an example embodiment.
Figure 2:
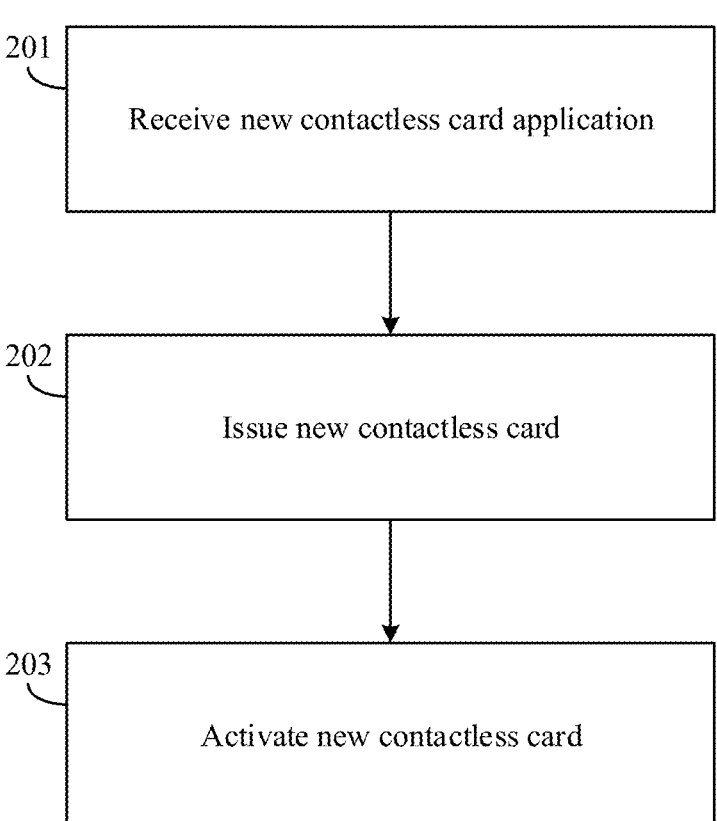

Referring now to FIG. 2, a method 200 of issuing and activating a new or replacement contactless card is shown according to an example embodiment. Because method 200 may be implemented using the components of FIG. 1, reference may be made to one or more components to aid explanation of method 200.

At process 201, a new contactless card application is received. In particular, at process 201, the card issuer computing system 108 receives a new contactless card application from a customer. For example, the customer may create the application for a contactless credit card at any of a number of brick and mortar locations. Or, as another example, the customer may create the application electronically, such as via a website displayed on the customer device 102. The new contactless card application can be received by the transaction card processing circuit 118 from the network 106 via a customer device 102 or website. Upon receipt of the application, the transaction card processing circuit 118 may cause an underwriting of the new contactless card using typical and conventional processes. In this regard, identifying information regarding the customer provided in the application may be stored in the customer database 120, which can be used for underwriting as well as subsequent authentication or authorization of transaction requests.

At process 202, upon completing the underwriting process and approving the new contactless card application for the applicant, the contactless card is issued. In particular, the transaction card processing circuit 118 causes issuance of the contactless card 104 corresponding to the contactless card application of the customer. Issuance includes causing or facilitating a sending of the contactless card 104 to the customer (e.g., by mail). In this regard, the transaction card processing circuit 118 sends instructions to have the card issued. The contactless card 104 may first be printed or otherwise generated by a manufacturer. The issuer may then directly or via a third party cause the information 114 to be loaded onto the card. An issuance request sent by the transaction card processing circuit 118 may include instructions to embed certain information 114 into the card. In one example, the issuance request includes instructions to embed a uniform recourse locator (URL) into a tag and, particularly a passive NFC tag, on the contactless enabled chip of the contactless card. As another example, the information may include a general URL, a customer specific URL, or specific identifying information based on the application (e.g., information regarding the applicants customer device, password, etc.). The customer may receive the contactless card 104 in a variety of ways. For example, the customer may pick up the contactless card 104 at a brick and mortar store or receive the contactless card in the mail.

At process 203, the new contactless card and associated account are activated. The activation is done via a tap-to-activate method. The tap-to-activate process includes a wireless transmission from the contactless card 104 to the customer device 102. In particular, the wireless transmission is an NFC communication between the contactless card 104 and customer device 102. In other embodiments, a different wireless transmission protocol may be used, such as Bluetooth. It is to be understood that while the physical embodiment of the contactless card 104 and the customer device 102 may be physically tapped, the communication of information 114 occurs wirelessly or without the presence of a physical electrical connection.

The customer device 102 may transmit information regarding the customer and the card to card issuer computing system 108 to activate the contactless card 104. In some embodiments, the customer device 102 may communicate continuously with the card issuer computing system 108 to verify and activate the contactless card. The contactless communication between the contactless card 104 and customer device 102 causes the customer device 102 to transmit data pre-loaded onto the card and information from the customer device 102 (e.g., phone number, carrier, or other identifying data) to the card issuer computing system 108. The card issuer computing system 108 may then automatically or nearly automatically activate the contactless card 104 for transactions (e.g., payments) based on information received during the application process. That is, the card issuer computing system may cross-reference stored data in the customer database 120 (e.g., from the application) with the information received as a result of the contactless communication and automatically activate the transaction card based on a successful cross-reference or matching. In other embodiments, more information is needed before activation occurs.

As described in detail below, the card issuer computing system 108 may save information regarding the customer device 102 that was received during the activation of the contactless card 104 to ease and enhance security of future contactless communications. For example, information regarding the customer device 102 may include the phone number, carrier information, serial number, mobile identification number (MIN), mobile subscription number (MSIN), etc. The card issuer computing system 108 may then reference the stored information regarding the customer device 102 during future password-less login attempts to the online account associated with the contactless card in order to provide enhanced security (e.g., by only allowing expedited password-less login on a known customer device) while reducing friction for the customer (e.g., by allowing the customer to tap their contactless card to their customer device in order to securely and quickly login to their account).

Figure 3:
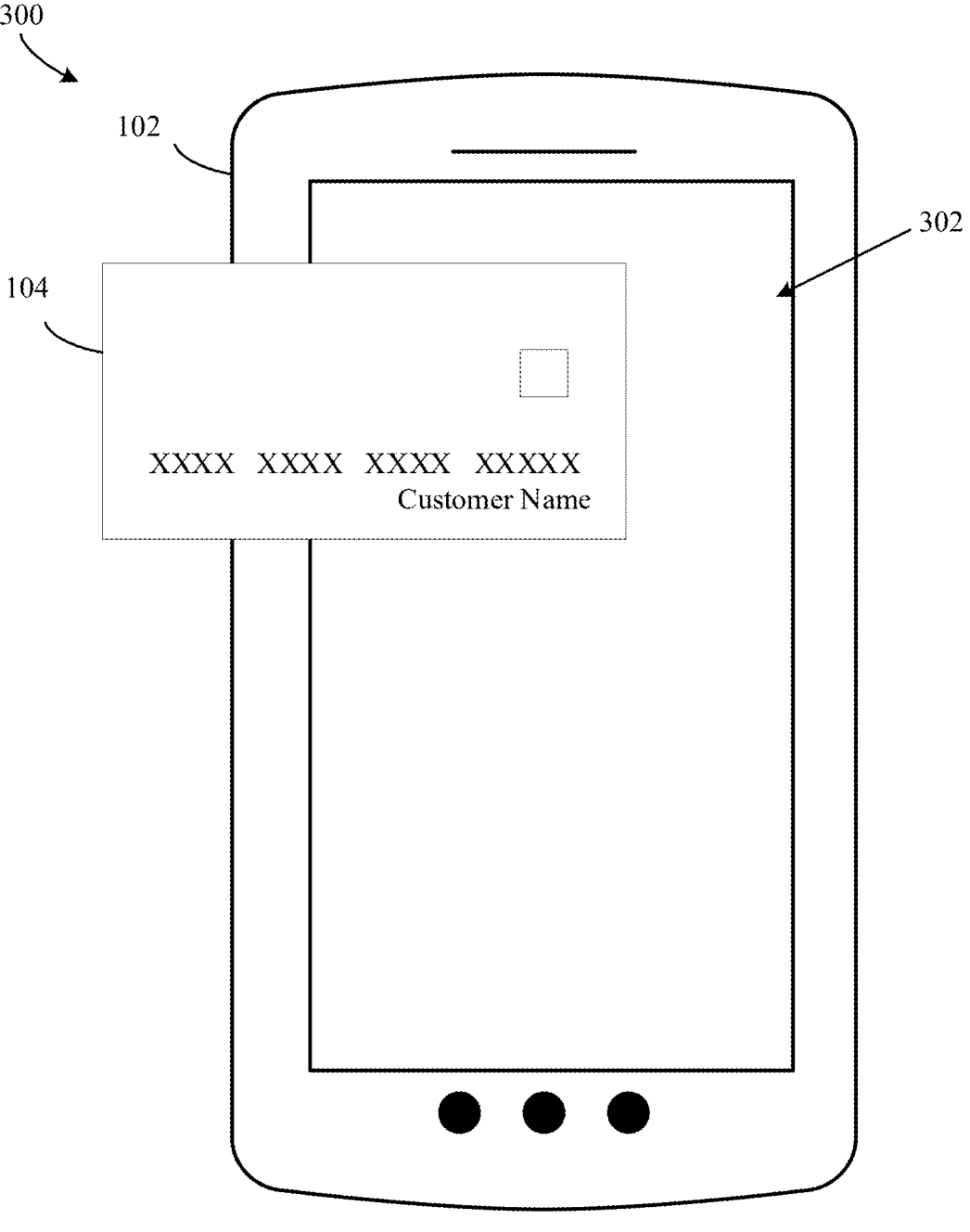
FIG. 3 illustrates a "tap" between a contactless card and a customer device, according to an example embodiment.

In summary of method 200, the contactless card 104 is tapped to the customer device 102. An example "tap" 300 is shown in FIG. 3. As shown, the customer device 102 is displaying a blank graphical user interface 302. That is, the customer device 102 is not displaying a mobile customer application or a web browser. Rather and in this example, the customer device 102 may be displaying a home screen. As depicted, the contactless card 104 is moved into close proximity of the wireless chip 112 of the customer device 102 and a contactless communication occurs. In the example shown, a NFC transmission of information from the card 104 to the device 102 occurs. In this regard, the wireless chip 112 receives the information 114 (in particular, only certain aspects thereof) as a result of the communication and forwards, passes, or otherwise transmits the transmitted information 114 to the processor 110 of the customer device 102. In one example, the customer device 102 accesses a tag 193 from the contactless card 104 as a result of the tap. A web browser application running on the customer device 102 is then redirected to an activation page. In one embodiment, the tag 193 includes a customer specific URL that directs the web browser to a customer specific activation page to activate their contactless card 104. In another embodiment, the tag 193 includes a general URL that directs the web browser to a general activation page where the customer can enter in verification information in order to activate the contactless card 104. In another embodiment, the card issuer computing system 108 already has information about the customer device 102 stored in a customer profile within the customer database 120 and when the contactless card 104 is tapped to customer device 102, the customer device 102 goes to a URL accessed within the tag 193 and the card issuer computing system 108 automatically activates the contactless card 104 based on the known customer device 102.

Figure 4:
FIG. 4 illustrates a method of a contactless communication between a customer device and a contactless card for at least one of activating the contactless card, enabling a password-less login into an account associated with the contactless card, or directing a customer to specific URL, according to example embodiments.
Figure 4:
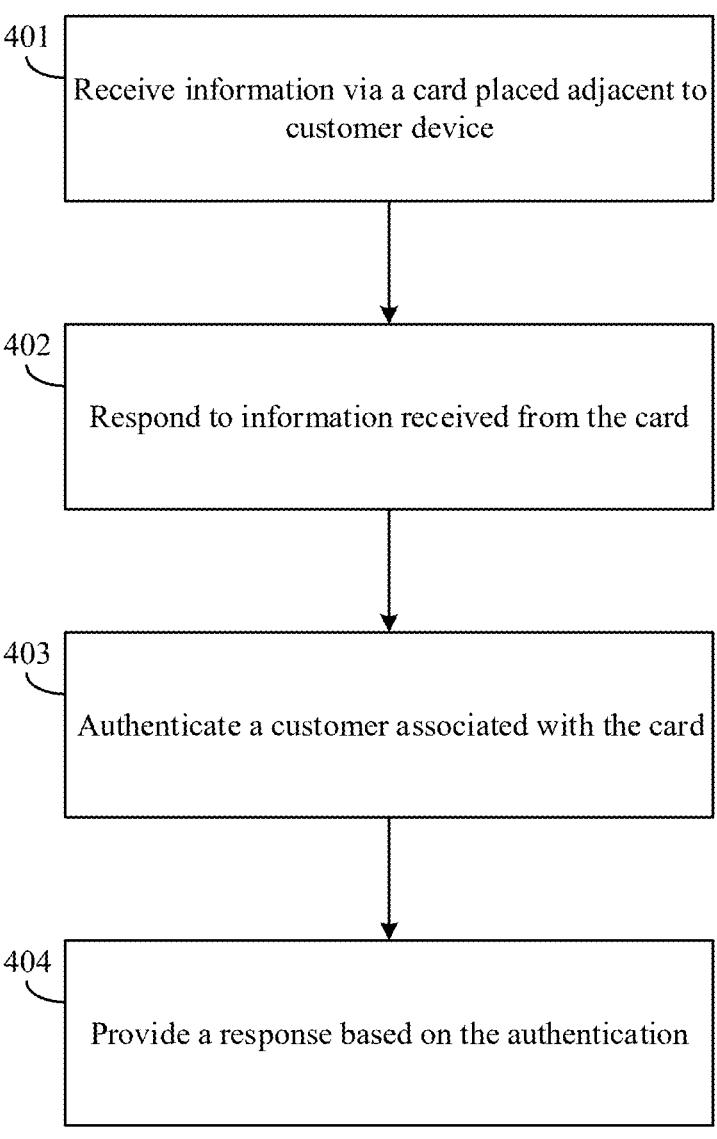

Referring now to FIG. 4, a method 400 of a contactless communication between a customer device and a contactless card for at least one activating the contactless card, enabling a password-less login into an account associated with the contactless card, or directing a customer to specific URL is shown, according to an example embodiment. Each of these example implementations are explained herein with respect to the method 400.

At process 401, information is received from a contactless card. In particular, a contactless card is placed near to, adjacent to, close to, or in contact or near-contact with a contactless reader to enable information to be transmitted wirelessly to the contactless reader. In particular, the contactless card 104 is placed adjacent to (e.g., within a distance that enables NFC communications to happen, such as 10 cm or less) the customer device 102 such that communication of the information is shared (e.g., the contactless card 104 is tapped to the customer device 102). As described herein, the information 114 may include a general URL address, a customer specific URL address, an authentication token, etc.

At process 402, a response to the information received occurs. In particular, the customer device 102 responds to the information 114 received from the contactless card 104. The response may be dependent on the information, the state of the device 102, and/or a combination thereof. For example, in one embodiment, the information 114 includes a customer-specific URL address and instructions that cause the customer device 102 to open a web browser, populate the customer-specific URL into the web browser, and display an activation or authentication web page related to the customer-specific URL. In this instance, the card 104 may be in the process of activation. According to an alternative embodiment, the information 114 includes instructions for the processor 110 to launch a mobile application on the mobile device 102 and display an activation page therein. In this alternative embodiment, the card 104 may be in the process of activation as well.

One response includes instructions to the device 102 to automatically open an application and go to a web page (e.g., URL) associated with a URL embedded on the contactless card 104. In some embodiments, the application may be a web browser. In some embodiments, the application may include a customer application downloaded on the customer device 102 provided by the card issuer. In some embodiments, the tap includes instructions to the customer device 102 that causes the processor 110 to automatically respond by opening the application and traveling to the URL (e.g., URL stored on the contactless card) provided to the customer device 102 via the contactless communication. The customer device 102 may have computer implementable instructions that cause the processor 110 to respond in a set manner that utilizes the information 114 transferred by the contactless communication.

In one example of a response, the information 114 includes a tag 193 that may have a general URL stored therein and the customer device 102 is in turn directed to display the webpage associated with the general URL on a display screen of the device 102. In this embodiment, the URL is associated with a general website for activating the contactless card. In operation, the customer device 102 may receive the tag 193 via a NFC tap between the contactless card 104 and the wireless interface 112. The customer device 102 determines the presence of the general URL in the tag 193 and automatically navigates to the web page associated with the general URL. In this example, the customer device 102 may have instructions stored thereon that cause the navigation. In another example, the tag 193 includes instructions to the customer device 102 that cause the customer device 102 to navigate to the web page. In some embodiments, instructions stored in the tag 193 also cause the account number on the contactless card 104 to automatically populate within a field of the web page associated with the general URL. In other embodiments, the tag 193 includes the account number as data and the customer device 102 includes instructions to automatically populate the account number into an appropriate field within the web page associated with the general URL. The web page associated with the general URL may then prompt the user to enter in additional information (e.g., a PIN) to verify the identity of the user. In certain embodiments and rather than transmitting and showing the account number, a tokenized version of the account number may be provided to the general website. This token may be cross-referenced with associated information, and the user may be required to enter information that is then matched to the information associated with the token. This may enable activation of the card or, after activation, account access. In this regard, the mobile device 102 may tokenize at least some of the information received from the card (e.g., the primary account number and expiration date of the card 104). Tokenization may be done via one or more scripts, processes, and the like stored in an application of the provider institution. The token may then be transmitted to the card issuer system 108 for authentication.

Based on the information transmitted in either the general or specific URL example (below), the customer device 102 may pre-populate the information regarding the card (e.g., the card number, expiration date) within fields on the website that may otherwise need to be manually entered in order to identify the customer to activate the card. Thus, the information may save time in pre-populating one or more fields of a website.

In a second example of a response, the information 114 includes a tag 193 that has a customer specific URL stored therein. In other words, the URL is unique or customer specific. In operation, the customer device 102 is directed to display the webpage associated with the customer specific URL on the display screen. The customer-specific website may not require entry of information regarding the contactless card. In this regard, the card may be automatically activated once the website is populated. As an example, information regarding the customer device may be matched with stored information to ensure that the customer device is associated with the intended customer of the card. This piece of information may be transmitted from the customer device to the provider institution computing system. Accordingly, information from each of the card and device is transmitted to the provider institution computing system, which can then verify the information and automatically activate the card without an explicit user input. Due to the potential limited use of the customer-specific URL (described above), the customer specific URL may then be deactivated while the card is activated such that the customer is free to use the contactless card. In another embodiment, another piece or pieces of information may be used to authenticate the customer and/or customer device in order to activate the card. Nonetheless, relatively little information may be required to activate the card relative to use of the general website. Examples of the another piece of pieces of information for activation may include any one or more of: confirmation of a code sent to the customer device, entry of a PIN, a confirmation of the name shown on the specific website, a previously-established password or passcode, and the like. Thus, use of the customer specific URL may streamline activation even more quickly than use of the general website URL.

After the contactless card has been activated, the customer specific URL may direct the customer device 102 to a unique online login portal. In other words, the website associated with the customer specific URL that was used to activate the card may give way to a unique online login portal. In this way, the customer specific URL enhances security by ensuring that only the specific customer device 102 (e.g., stored in the account database 120) authenticated for the customer can enter into the online account associated with the card. The customer specific URL directs the customer device 102 to a unique login portal and information regarding the customer device 102 can be utilized by the card issuer computing system 108 to verify that the customer device 102 is "registered" to the customer associated with the transaction card to allow access to the customer's online account. In this usage, "registered" may mean that the customer device 102 and related information about the customer device 102 is stored in the customer database 120 such that the card issuer computing system 108 can identify the customer device associated with a particular customer. The customer device 102 may be "registered" during the application process for the account or transaction card. In some embodiments, as explained below, the customer device 102 may be "registered" or identifiable based on information received regarding the customer device 102 during activation of the transaction card or authentication of the customer device 102 during a password-less login attempt.

In another example, the tag 193 may be used to reset a user's password (or, more generally, their credential) for their online account. This process is implemented after activation of the card. In one implementation, the user may already be at a web page login for the account or a mobile application login attempting to access the online accounts associated with the contactless card 104. The user may have forgotten his/her password and select an icon of "forgot password" on the screen. The user may then tap the contactless card 104 to the customer device 102. The customer device 102 receives the tag 193 as a result of the NFC tap and may transmit the tag 193 (e.g., and associated data) to the card issuer computing system 108. The card issuer computing system 108 may then verify that the information contained in the tag 193 is associated with the user's account and transmit instructions to the customer device 102 to display a password reset page. The customer may simply enter into the customer device 102 a new password and have this new password effective immediately. In this example, the card issuer computing system 108 verifies that the user is in possession of the contactless card 104 and the customer device 102 (i.e., a match of these two components) to securely allow the user to reset his/her password. In other embodiments, the card issuer computing system 108 may require additional authentication information if the customer device 102 is not recognized. Thus, in this example, security of the online account is achieved while also reducing the time commitment (e.g., friction) of the customer.

As mentioned above, the response may depend on the state or configuration of the customer device 102. For example, the customer device 102 may be displaying a home screen when the tap occurs. As another example, the customer device 102 is displaying a customer application, such as a mobile application, associated with the card issuer when the contactless card is tapped to the customer device 102. In still another example, the customer device 102 is displaying a browser (e.g., Safari® or Chrome®) when the contactless card is tapped to the customer device 102. In one embodiment, the tag may include or be accompanied by instructions used to at least one of activate a web browser (e.g., from a home screen), direct the application to either a card activation screen or a log-in screen (e.g., for password-less login), or direct the browser that may be displayed on the device 102 to the embedded URL. In this configuration, the tag includes instructions that are applicable with each of these configurations of the device 102. In another embodiments, the instructions may require the device 102 to be in a particular state, such as unlocked and on a home screen or unlocked with a browser open.

At process 403, authentication information is received. In particular, the mobile device 102 receives authentication information regarding the customer associated with the card. In one embodiment, the customer may enter the authentication information. For example, the customer provide authentication information on an authentication page accessible by the general or specific URL described above. For example, the authentication page displayed in a mobile application on the customer device 102 may ask for a PIN related to the account. Authentication information may also include, for example, biometric data, identifying information, a portion of the customer's social security number, phone number, etc., and/or a combination thereof. In certain embodiments and as described above, the customer device may also be authenticated or verified during this process.

The customer device 102 may automatically forward information or otherwise communicate with the card issuer computing system 108 in response to the tap. For example, the customer device 102 may have instructions (or receive instructions embedded on the contactless card 104) to send information (e.g., identifying information) from the contactless card 104 (e.g., received as a result of the tap) and information about the customer device 102 (e.g., identifying information such as phone number, MIS, or location) to the card issuer computing system 108. Thus and with respect to the authentication information, the card issuer computing system 108 may then cross-reference or otherwise verify the information in order to automatically authenticate the customer and/or activate the card. For example, the card issuer computing system 108 may verify the information received based on the location of the customer device 102, a phone number of the customer device 102, type of customer device 102, and information received during the application process or information stored in the customer database 120. For example, the location of the device may be used in authenticating the customer: if the customer is in a predefined location or on a non-open network, then they may pass the first layer of authentication. In some embodiments, the contactless card 104 may be automatically activated based on the received information (i.e., without additional authentication information). The card issuer computing system 108 may then send a confirmation notification in response to successfully verifying and activating the contactless card 104. In some embodiments, more information is needed and the card issuer computing system 108 transmits or otherwise causes a prompt to the customer to enter in more identifying information in order to complete activation of the transaction card or authentication of the customer.

At process 404, a response is provided based on the authentication. Assuming the card issuer has authenticated the card and/or user, at process 404, the mobile device provides a response to the customer regarding the authentication. Regarding card activation, the customer device 102 may receive a confirmation of the authentication and resulting activation of the contactless card 104 from the card issuer computing system 108. Regarding password-less login, the card issuer computing system 108 transmits instructions and re-directs the web browser or mobile application to a dashboard of the online account in response to a successful authentication of the customer during the password-less login. The card issuer computing system 108 may transmit instructions and re-direct the web browser or mobile application displayed on the customer device 102 to display a confirmation notification. In some embodiments, the processor of the customer device 102 automatically re-directs the web-browser or mobile application to a different page that displays a received notification or confirmation.

Figure 5:
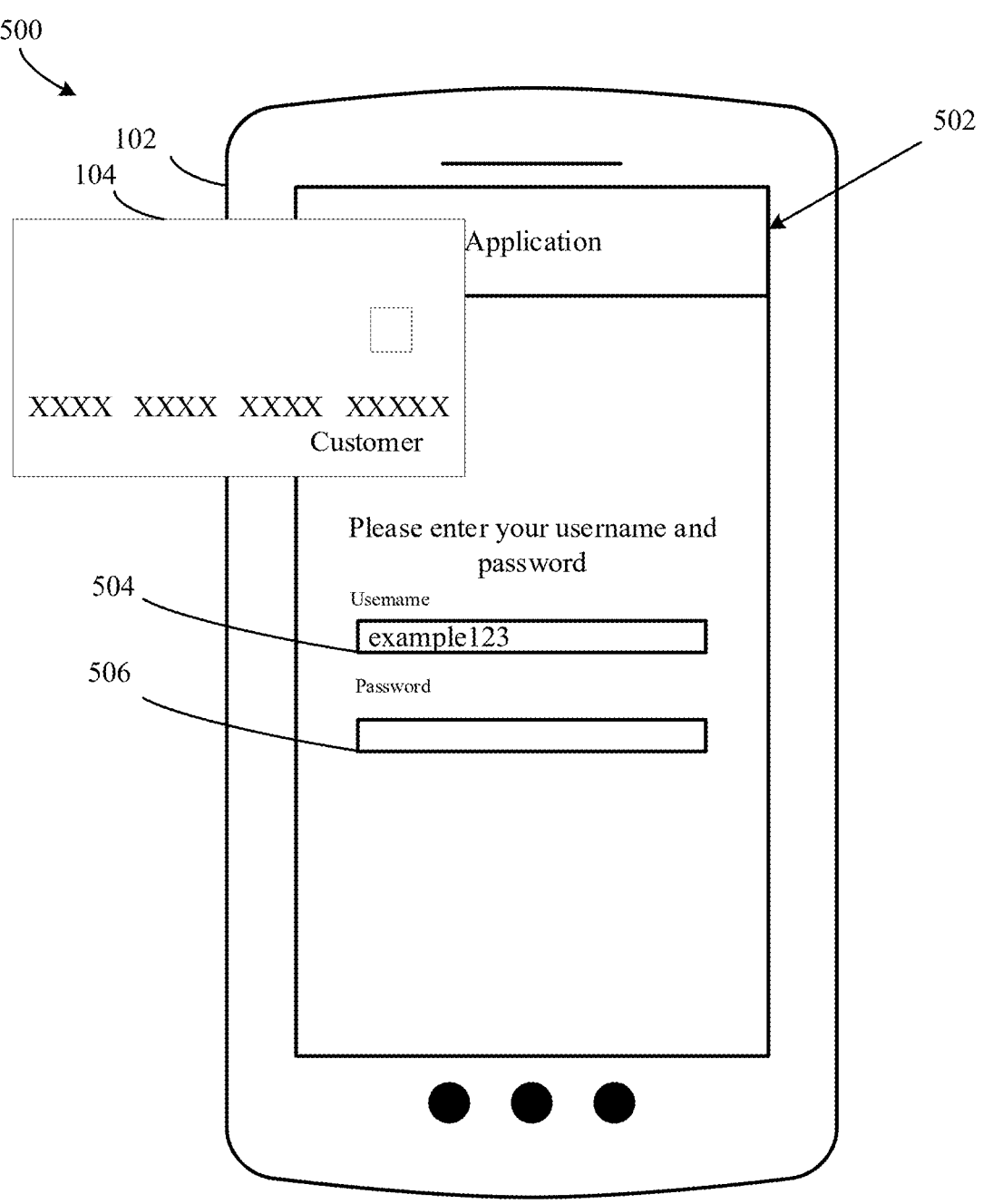
FIG. 5 depicts a contactless card and a customer device being tapped together for a password-less account login, according to an example embodiment.

Referring now to FIG. 5, an example 500 of a contactless card 104 and a customer device 102 being tapped together for a password-less login is shown and explained. FIG. 5 builds on the method 400. In particular, in this embodiment, the customer has established an account at the card issuer institution (i.e., provider institution associated with the computing system 108). Accordingly, the customer may have established credentials for accessing an account associated with the card 104 (e.g., a username and password, answers to security questions, etc.). FIG. 5 depicts an improvement where the user does not have to enter their credentials manually, nor does the user have to store their password electronically within the customer device 102 or on the cloud. This improvement results in low friction for the user and potentially less risk of the user's account information being hacked or stolen.

In the example shown, a graphical user interface of a login page 502 may be displayed in a customer application that has been installed on the customer device 102. In some embodiments, the graphical user interface depicts a login page 502 displayed in a web-browser. The graphical user interface of the login page 502 may be displayed in response to the communication between the contactless card 104 and customer device 102 (e.g., the NFC tap described herein). In some embodiments, such as the in the example depicted in FIG. 5, the graphical user interface of the login page 502 may be first opened on the customer device 102 by the customer, the customer may then tap the contactless card 104 to the mobile device 102 such that communication of the information 114 occurs there-between. The customer application running on the customer device 102 may simulate a contactless payment and obtain card data (e.g., PAN, expiration data, etc.) regarding the contactless card. The customer application may convert the card data to a token (alternatively, the received contactless card data may already be tokenized). In either configuration, tokenization protects the sensitive information (e.g., the PAN). Further, the token, which in this instance refers to tokenized card data such as the PAN, in combination with the customer device data (e.g., phone number, serial number, etc.) serves as the credentials for the account. The customer device 102 transmits the token and customer device data to the card issuer computing system 108. The card issuer computing system 108 receives this information, which may be processed as business as usual using the transaction card processing circuit 118. The token may be associated with the customer (e.g., via a customer identifier associated with the token) so that the circuit 118 may identify and confirm that the user is indeed associated with this card to authorize and enable account access. Thus, in this situation, the customer does not have to provide any type of information and account access is automatic. In some embodiments, the customer first enters their username 504, then taps the contactless card 104 to the customer device 102 to auto-populate the password 506 field. In some embodiments, the login page 502 may not display the username 504 and password 506 fields, rather the login page 502 may simply prompt the customer to tap the contactless card 104 against the customer device 102 to login. In each of these configurations, a relatively easy method of logging onto the user's online account associated with the card is provided to enable viewing and managing the account.

In one example of password-less login that requires additional authentication information, the customer device 102 may display a prompt to the user for a second form of authentication in order to complete the login. If the card issuer computing system 108 does not recognize the user associated with the contactless card 104 (e.g., an password) as the user associated with the customer device 102, then the card issuer computing system 108 may prompt the user for a second form of authentication in order to enhance security. Examples of second forms of authentication may include instructions for the customer to enter biometric data into the customer device 102, enter in a personal identification number (PIN) of the customer, or enter in other authentication information such as the last four numbers of the customer's social security number, phone number, etc.

Figure 6:
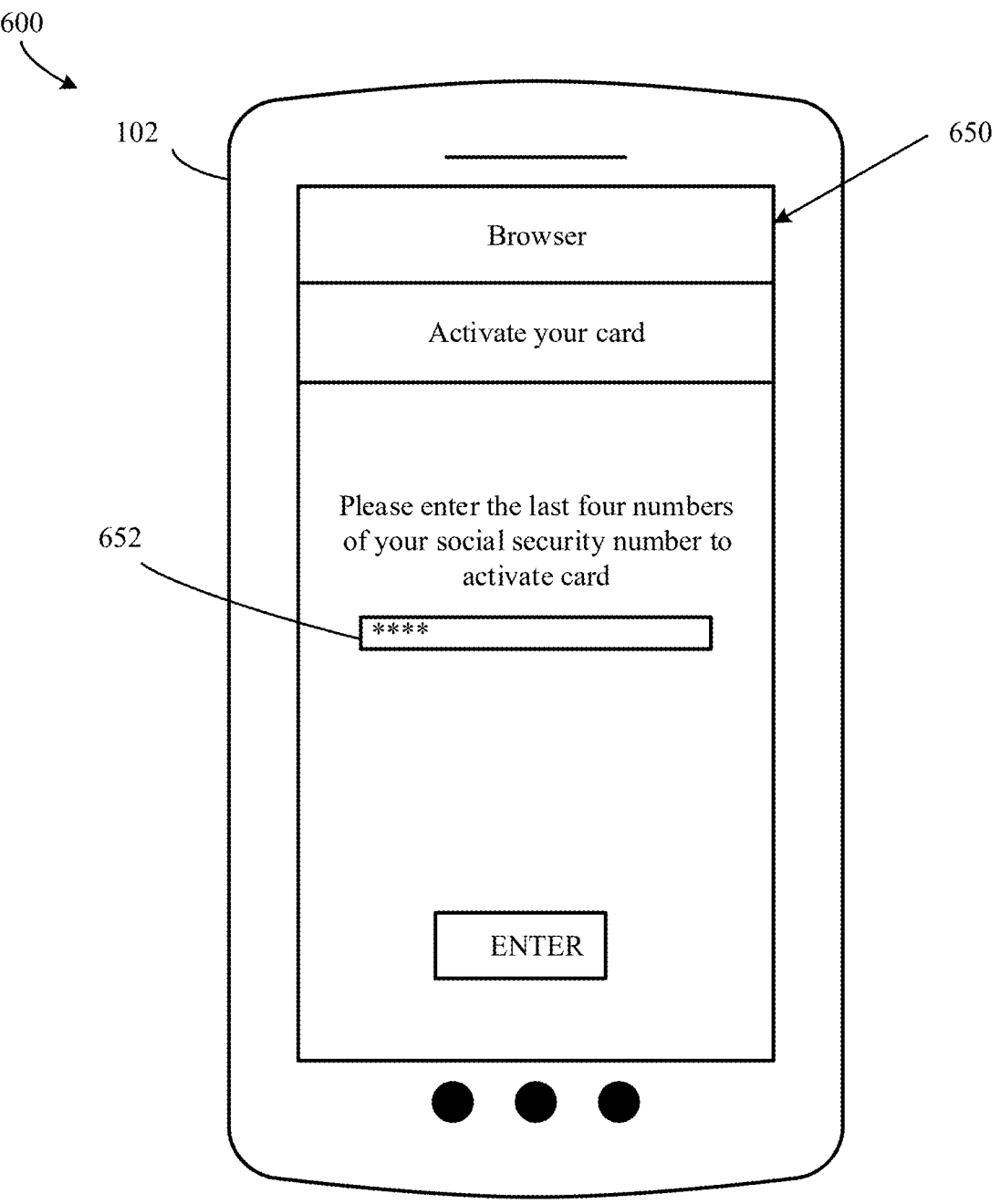
FIG. 6 depicts a customer device having a graphical user interface displaying an authentication page, according to an example embodiment.

Referring now to FIG. 6, an exemplary image of requiring additional authentication information is shown. Here, a customer device displaying an authentication page 650 on a graphical user interface is shown, in accordance with an example embodiment. The authentication page 650 may be displayed via a web browser on the customer device 102. In this example, the authentication page 650 includes a verification field 652. The verification field is a field that a customer may enter in their authentication information. In FIG. 6, the verification field 652 and related prompt request is for the customer to enter a portion of their social security number (e.g., the last four digits of the social security number). In other embodiments, other forms of authentication information may be used/required. The customer may enter their last four digits of their social security number into the verification field 652 via a keyboard on or displayed on the customer device 102. This additional authentication information may be sent to the circuit 118, which matches this information with stored information regarding the customer to authenticate the customer.

The customer device 102 may forward the authentication information to the card issuer computing system 108 in order to authenticate the customer. For example, the customer device 102 may transmit via the network 106 information entered into the authentication page (e.g., PIN, address, security questions filled out in the application, online login credentials if the customer is an existing customer, etc.). The card issuer computing system 108 may then authenticate the customer to either activate the contactless card 104 for use in transactions such as payments, and/or allow access to the online accounts associated with the transaction card. Thus, this secondary authentication information process may be used with card activation and/or account access. In some embodiments, the customer device may send an indication to card issuer computing system 108 that the customer has already logged into the phone (i.e., customer device 102) via a passcode or biometric scan, with such information also serving as the authentication data/information (i.e., the secondary authentication information). This dual factor authentication provides minimal friction to the customer. That is, the computing system provides enhanced security by requiring two forms of authentication (e.g., the tap of the card and entry of information) while minimizing the inconvenience to the customer.

In some embodiments, the card issuer computing system 108 may save the information received regarding the customer device 102 into the customer database 120 automatically (e.g., "register" the customer device 102 to the authenticated customer) in response to the successful authentication of the customer. In some embodiments, the card issuer computing system 108 may transmit instructions, or otherwise cause the customer device 102 to prompt the customer with selectable "Yes" or "No" icons regarding whether the customer would like the card issuer computing system 108 to save information regarding the customer device 102 in the customer database 120. If the information regarding the customer device 102 is saved in the customer database 120, then future authentications of password-less logins via a tap between the customer device 102 and contactless card 104 may be expedited in the future. If the information regarding the customer device 102 is not saved in the customer database 120 (e.g., the customer responded "No"), then future authentications for the password-less login may require process 403 to ensure security.

Figure 7A:
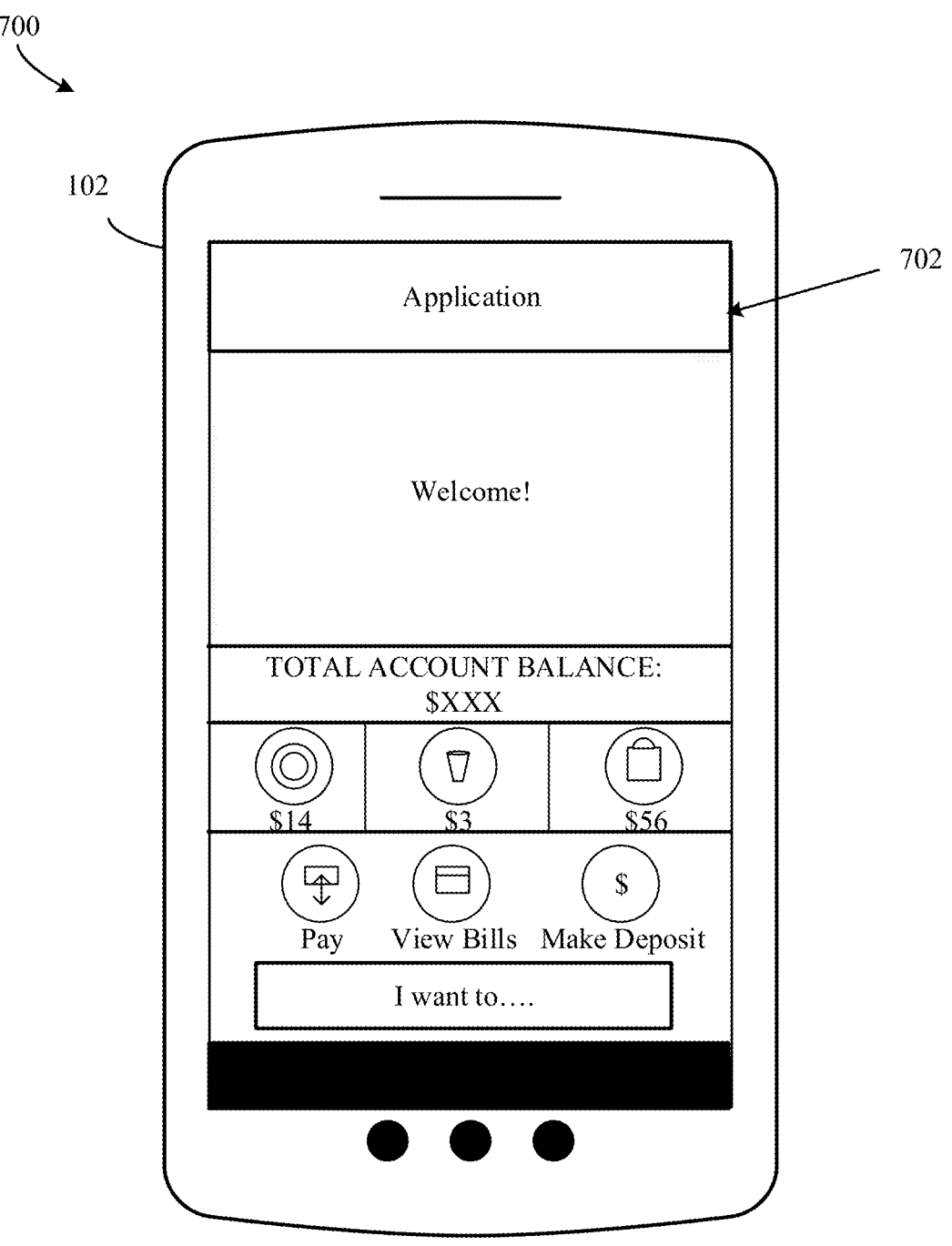
FIG. 7A depicts a customer device displaying an online account dashboard, according to an example embodiment.

Referring now to FIG. 7A, the customer device 102 displaying an online account dashboard 700 on a graphical user interface 702 according to an example embodiment is shown. In some embodiments, the graphical user interface 702 may be displayed on a web-browser or within the customer application on the customer device 102. The dashboard may be shown automatically without requiring credentials based on the password-less login described above. The online account dashboard 700 may have been automatically displayed in response to the customer entering in the verification information. The customer device 102 may contain instructions stored thereon to automatically re-direct and try to gain access to the online account dashboard 700 in response to the password-less login and account activation. In some embodiments, the customer device 102 receives instructions to re-direct the graphical user interface to the online account dashboard from the card issuer computing system 108. The online account dashboard 700 may allow the customer full access to the customer's online accounts to manage same. The online account may include the account associated with the contactless card 104 along with other checking, savings, or credit accounts that the customer has with the provider institution.

Figure 7B:
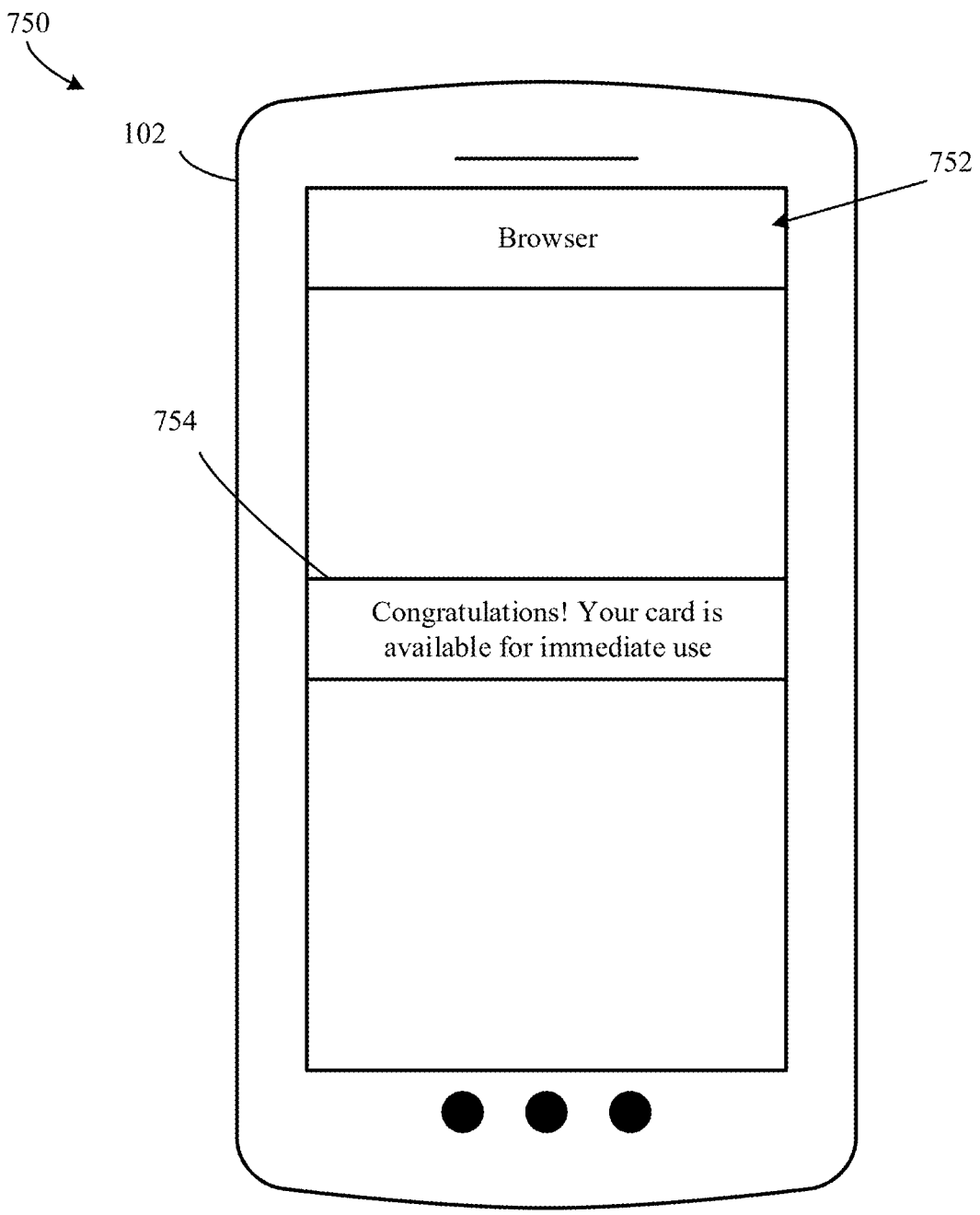
FIG. 7B depicts a customer device displaying a confirmation page on a graphical user interface, according to an example embodiment.

FIG. 7A may be subsequent to FIG. 7B. FIG. 7B shows a customer device displaying a confirmation page 750 on a graphical user interface 752 upon activation of the card, according to an example embodiment. The confirmation page 750 includes a confirmation notification 754 that is intended to notify the customer that the contactless card has been successfully activated and is available for immediate use. As discussed above, the graphical user interface 752 may be displayed in a web browser or within a customer application. In some embodiments, the confirmation page 750 may be displayed in response to instructions to re-direct the graphical user interface of the customer device 102. In some embodiments, the customer device 102 may automatically re-direct the graphical user interface to display any notification, error, denial, or confirmation received from the card issuer computing system 108.

Figure 8:
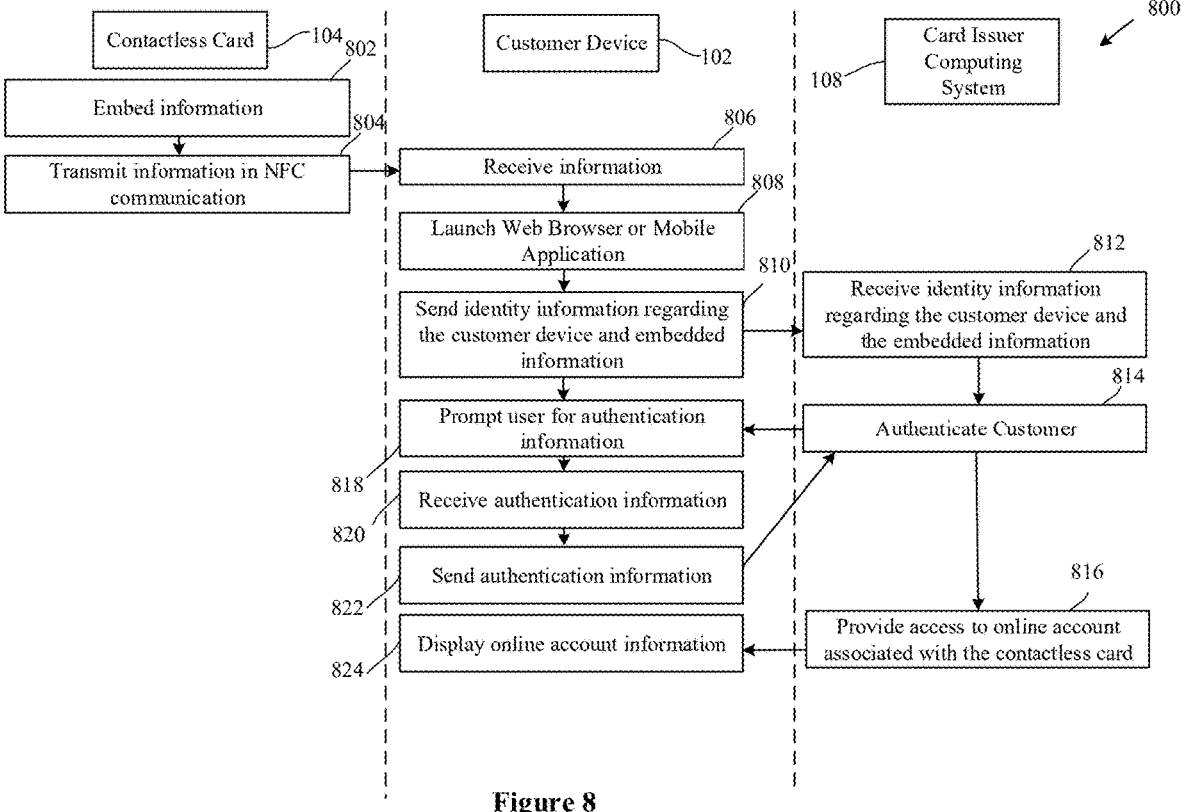
FIG. 8 depicts a flow diagram of a method of a password-less login to an account, according to an example embodiment.

Referring now to FIG. 8, a flow diagram 800 of a method of a passwordless login to an account is shown, according to an example embodiment. The method 800 depicts a flow from the contactless card 104, the customer device 102, and the card issuer computing system 108.

In process 802, information regarding accessing an account associated with the contactless card is embedded in the card. In particular, this information may be embedded in the record 193. This "account access" information may include information regarding the user's customer device, a username, a PIN, a password, and so on. According to one embodiment, this information is preloaded into the chip 115 when the user receives the card 104. In another embodiment, this information may be written to the chip 115 (e.g., added to the tag 193) during a transaction with the card 104 (e.g., during a tap with the customer device 102). As described herein, this information may also include the customer-specific URL or general website URL that is embedded in the record 193 of the contactless enabled chip/interface.

At process 804, the contactless card transmits the information to the customer device 102 via a NFC transmission. In other words, the customer device 102 causes the tag to be transmitted to the customer device 102.

At process 806, the customer device 102 receives the transmitted information within the tag. That is, the customer device 102 receives the tag and embedded information as a result of the NFC communication. At process 808, the customer device 102 reacts or otherwise responds to the NFC communication by launching a web browser or a mobile application to access an online account associated with the contactless card 104. At process 810, the customer device 102 sends identity information such as a MIN, MSIN, or phone number regarding the customer device 102 and the embedded information received from the contactless card 104 to the card issuer computing system 108 via the network 106.

At process 812, the card issuer computing system 108 receives the identity information regarding the customer device 102 and the embedded information. At process 814, the card issuer computing system 108 authenticates the customer. In an example, the card issuer computing system 108 may verify that a customer profile within a customer database 120 includes the identity information of the customer device 102 and that the customer profile also includes the embedded information that is specific to that contactless card 104. In this way, the card issuer computing system 108 may automatically authenticate the user and provide access, at process 816, to the account associated with the contactless card because of the known and verified information. Thus, the card issuer computing system 108 can automatically authenticate the user and provide access to the online account since there are already two security measures overcome. For example, the first security measure is that the user is in possession of the "registered" customer device 102 and the contactless card 104. The second security measure is that the user was able to access or unlock the customer device 102. In this way, security of the accounts associated with the contactless card 104 is provided and friction for the user in accessing the accounts is reduced. Alternatively, the tap may be done when the device is in the locked state. The tap may cause the phone (i.e., device) to wake-up and the user's biometric may unlock the phone. Then, the process may continue as described above.

Alternatively, if the customer device 102 is not yet "registered" or the identity information of the customer device 102 cannot be verified based on the customer profile, then at process 818 the customer device 102 receives a prompt for authentication information. The customer device 102 may then redirect the display of the web browser or the mobile application to display a request to the user for authentication information. Examples of such a display is shown and described in reference to FIG. 6. At a process 820, the customer device 102 receives the authentication information as an input on the device. At process 822, the customer device 102 then forwards the received authentication information to the card issuer computing system 108. The card issuer computing system 108, at process 814, may then automatically authenticate the user based on the received authentication information. In one example, the card issuer computing system 108 authenticates the user by cross referencing the authentication information with information stored in the customer profile within the customer database 120. After the user is authenticated, the card issuer computing system 108 provides access to the online account associated with the contactless card 104 only to the customer device 102. In one example, the card issuer computing system 108 sends instructions to the customer device 102 that causes the customer device 102 to display the online account information on a display.

At a process 824, the customer device 102 receives confirmation of the authentication and displays via a graphical user interface on either the web browser or mobile application the online account information. In some embodiments, the user may make a payment, transfer funds, redeem rewards, close the account and so on from the page displaying the online account information. In some embodiments, as explained above, the user will have an option during the authentication process to "register" the customer device 102 for faster access to the online accounts in the future.

Figure 9:
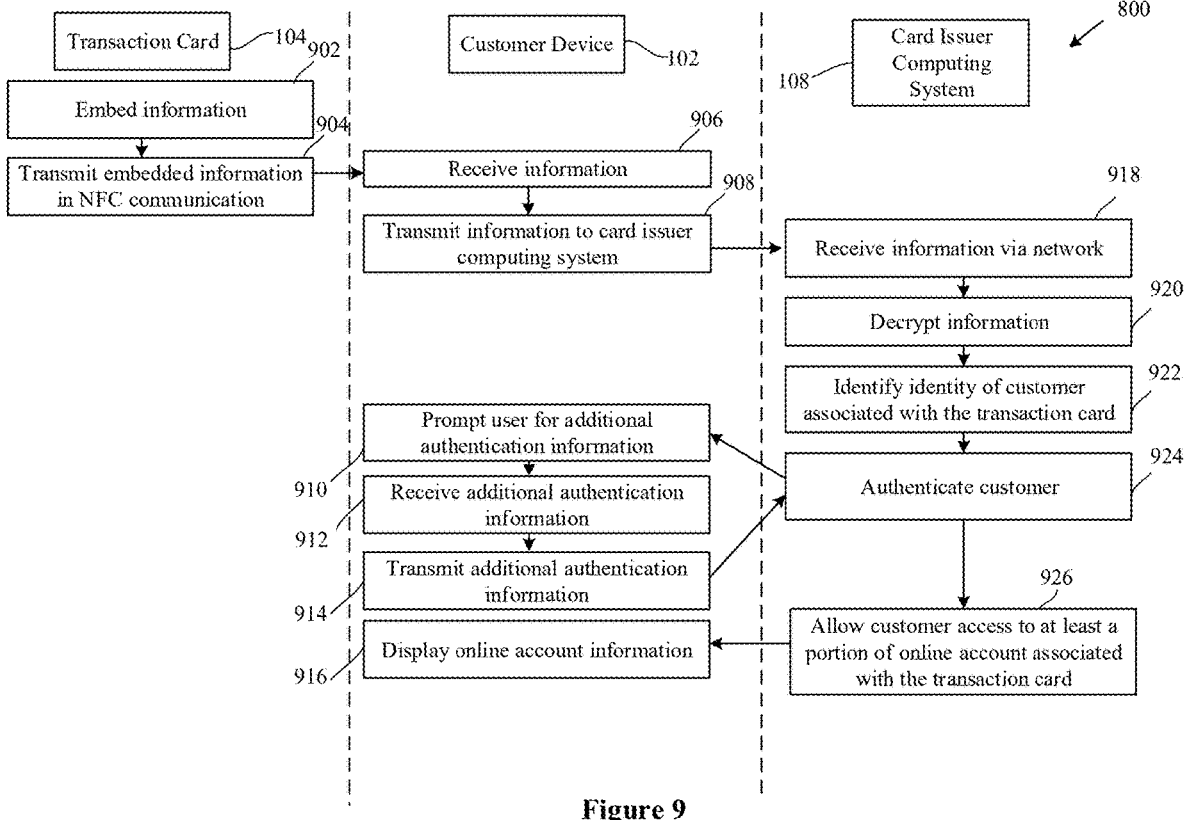
FIG. 9 depicts a flow diagram of a method of communicating with a transaction card in order to identify a customer, according to an example embodiment.

Referring now to FIG. 9, a flow diagram 900 of a method of a communicating with a transaction card having key stored thereon to identify a customer is shown, according to an example embodiment. In some embodiments, the transaction card 104 may include payment information and information that is indicative of an identity of a user associated with the card. That is, in some embodiments, the transaction card 104 may include a tag 193 that is configured to store payment account information and information that is indicative of the identity of the user associated with the transaction card. The information that is indicative of the identity of the user associated with the user of the transaction card may include a cryptographic key, a cryptographic token, or a digital certificate stored within the tag 193. The information that is indicative of the identity of the user associated with the user may not be used to validate or authorize a transaction. Alternatively, the payment account information may be used to identify the user instead of, or in addition to, the information that is indicative of the identity of the user associated with the transaction card. The cryptographic key may be used to allow the user to access a portion of their online account information, change a password of the online account, or to otherwise identify or authenticate the user.

At a process 902, the transaction card 104 is embedded with information. In some embodiments, the information includes payment account information and information that is indicative of an identity of a user associated with the transaction card. In some embodiments, the information embedded on the transaction card 104 includes only the information that is indicative of an identity of a user associated with the transaction card. The information that is indicative of an identity of a user associated with the transaction card includes a cryptographic key, a cryptographic token, or a digital certificate. The information that is indicative of an identity of a user associated with the transaction card may also be stored within a database of a card issuer computing system 108 at the time of issuance of the transaction card 104. For example, the database may include a list of corresponding keys that may be used by the card issuer computing system 108 to identify a particular transaction card and/or identify of a user associated with the transaction card 104.

In some embodiments, at process 902, the transaction card 104 is also embedded with an encryption algorithm that is configured to encrypt the cryptographic key or cryptographic token stored on transaction card 104. In some embodiments, the encryption algorithm includes a cryptographic algorithm. In one example of an encryption algorithm, the transaction card 104 may be configured to receive a request from a device (e.g., a customer device 102 having a near-field communications NFC reader) that includes a request for the cryptographic key or token and a seed (e.g., a bit sequence, random number, or word). The request may then cause the transaction card 104 to perform an encryption of the cryptographic key using the seed, the cryptographic key or token (e.g., stored within the transaction card), and/or other information as inputs into the encryption algorithm and cause the transaction card 104 to transmit the output of the encryption algorithm to the device (e.g., the customer device 102).

In some embodiments, the request of the command also causes a count register of the tag 193 to increment (e.g., count up). The encryption algorithm (e.g., cryptographic algorithm) may have multiple inputs including a value of the count register, the cryptographic key, and the seed and a single output that may be transmitted to the customer device. In some embodiments, the seed is a random number or data bit(s) (e.g., 1, 2, 3, 4, 5, or more bits) that is randomly generated by the customer device 102 when the customer device 102 makes the request.

The transaction card 104 may be configured to embed the information that is indicative of an identity of a user associated with the transaction card within a uniform resource locator (URL) string configured to cause a customer device 102 to navigate to a particular web address and pass the embedded information that is indicative of the identity of the user to a card issuer computing system 108. This may be advantageous because it allows a user to use their transaction card with one or many different customer devices 102 and/or terminals to access their account in response to a two, three, or four factor authentication. More details regarding the encryption algorithm and other algorithms stored on the transaction card 104 are discussed in more detail herein.

At process 904, the contactless card transmits the information to the customer device 102 via a NFC transmission. In other words, the customer device 102 causes at least a portion of the tag (e.g., information that is indicative of an identity of a user associated with the transaction card) to be sent to the customer device 102. In some embodiments, the contactless card does not transmit any payment account information to the customer device 102 at process 904. In other embodiments, the contactless card 104 may transmit both payment account information and information that is indicative of an identity of a user associated with the transaction card at process 904. In some embodiments, the contactless card 104 may transmit only payment card information at process 904. In an example, the exact information that is sent at process 904 is dependent upon a command (e.g., a wirelessly transmitted NDEF message that requests particular information) made by the customer device 102 to the transaction card 104. That is, in some the transaction card 104 may have an integrated circuit that is responsive to particular commands made by the customer device 102. In some embodiments, the information that is indicative of an identity of a user associated with the transaction card is first encrypted as explained throughout FIG. 9, and below in reference to FIG. 10.

At process 906, the customer device 102 receives the information from the transaction card 104. In some embodiments, the customer device 102 receives the encrypted information that is indicative of an identity of a user associated with the transaction card. In some embodiments, the customer device 102 receives the payment account information and packages and encrypts the payment account information via an encryption algorithm stored within the mobile application on the customer device 102. In some embodiments, the customer device 102 receives a URL from the transaction card that has the information that is indicative of an identity of a user associated with the transaction card stored within a query string. The customer device 102 may be configured to automatically launch a browser (or to otherwise automatically navigate a browser) of the customer device 102 to the URL. In this way, the customer device 102 navigates to the URL received from the transaction card, the customer device 102 may act as a conduit in transmitting the data stored within the query string (e.g., the information that is indicative of an identity of a user associated with the transaction card) directly to the card issuer computing system 108.

At process 908, the customer device 102 transmits the information that is indicative of an identity of a user associated with the transaction card to the card issuer computing system 108. As indicated above, the customer device 102 acts as a conduit and automatically forwards the information that is indicative of an identity of a user associated with the transaction card. For example, the customer device 102 may include instructions stored thereon that are configured to cause the customer device 102 to automatically forward the information that is indicative of an identity of a user associated with the transaction card in response to requesting and receiving the information from the transaction card 104 (e.g., via processes 902-906).

In some embodiments, the customer device 102 receives instructions from the transaction card 104 (e.g., stored within the tag 193) that are configured to cause the customer device 102 to automatically forward the information that is indicative of an identity of a user associated with the transaction card to the card issuer computing system 108. For example, the customer device 102 may receive instructions to automatically transmit the received information from the transaction card 104 in response to the contactless communication to the card issuer computing system 108 via the network. In this way, the card issuer computing system 108 may always or substantially always (e.g., always unless an error happens) receive notifications of a contactless communication (e.g., a contactless communication requesting identity information) between a customer device 102 and a transaction card 104 immediately after the contactless communication occurs. Thus, the card issuer computing system 108 is able to monitor and check for potential fraud or theft. For example, the card issuer computing system 108 may detect or monitor for contactless communications between a customer device that is not known (e.g., a customer device that does not belong to or have been used by the user) and the transaction card 104 in order to flag a potential fraudulent activity (e.g., a non-recognized customer device). Further, in the case that the customer device 102 does not respond or cannot respond to the instructions to transmit identity information to the card issuer computing system 108, a time stamp placed on the identity information (e.g., via the encryption algorithm on the transaction card) may be used to determine that the contactless communication occurred after a pre-determined amount of time (e.g., 5 minutes) and, in response, automatically block access to an account.

In some embodiments, the information that is indicative of an identity of a user associated with the transaction card includes a cryptographic key or token that is stored within a space in a memory of the transaction card 104. In some embodiments, the transaction card 104 may use the cryptographic key and seed information (e.g., and/or other information such as a count number) as inputs into an encryption algorithm (e.g., a cryptographic algorithm) and outputs a bit sequence that may represent the encrypted cryptographic key. In some embodiments, the customer device 102 may forward the received encrypted cryptographic key and seed information (and/or other information such as the count number of how many times the cryptographic key has been requested) to the card issuer computing system 108. For example, in some embodiments, the customer device 102 may be running a web page associated with the card issuer on a web browser or a mobile application associated with the card issuer that includes executable instructions that cause the customer device 102 to automatically encrypt, package, and forward the information received from the transaction card 104 to the card issuer computing system 108 via the network. For example, FIG. 10 includes examples of how the customer device 102 may be running a program that causes the customer device to package or encrypt the information received from the transaction card 104 (e.g., the encrypted information and/or other information) and transmit the package and/or information received from the transaction card 104 to the card issuer computing system 108.

In some embodiments, the information that is indicative of an identity of a user associated with the transaction card is received from the transaction card 104 (e.g., the tag) and is embedded within a query string of a URL. The customer device 102 may have instructions stored thereon that automatically enter the URL into a browser or similar application and cause the information that is indicative of an identity of a user associated with the transaction card to be sent to the card issuer computing system 108. For example, the customer device 102 may automatically recognize receipt of a URL and execute instructions stored thereon that cause the customer device 102 to navigate to the URL (e.g., open a browser or enter the URL into the browser.) The URL may include a domain associated with the card issuer computing system 108, and the information that is indicative of an identity of a user associated with the transaction card may be embedded within the URL (e.g., within a query string of the URL). Thus, when the customer device 102 navigates to the URL, the customer device 102 navigates or interfaces with the card issuer computing system 108 via requesting internet access into the domain of the card issuer computing system 108 and the information indicative of the identity of the user associated with the transaction card (e.g., encrypted identity information) may be automatically entered or passed to the card issuer computing system 108. Thus, this technology may allow for a streamlined access via a customer to their online account via many different customer device 102 (e.g., via a tap and contactless communication), while also protecting the account from unauthorized users via the key, algorithm, and/or multi-layered authentication steps (e.g., such as requesting additional authentication information).

At process 918, the card issuer computing system 108 receives the information that is indicative of an identity of a user associated with the transaction card via a network connection to the customer device 102. At process 920, the card issuer computing system 108 may decrypt the received information that is indicative of an identity of a user associated with the transaction card. For example, the card issuer computing system 108 may receive, as the information, an encrypted cryptographic key, seed information that was used to generate the cryptographic key, and/or a count number. The card issuer computing system 108 may then use the encrypted cryptographic key, the seed information that was used to generate the encrypted cryptographic key, and/or the count number as inputs into a decryption algorithm in order to generate an output that is used by the card issuer computing system 108 to cross-reference the output within a database on the card issuer computing system 108 that includes multiple cryptographic keys, each corresponding to a different customer. In this way, the decryption algorithm (and associated encryption algorithm on the transaction card 104 and/or the customer device 102) ensures that a hacker or other electronic thief may not intercept the information in a form that has any value. Additionally or alternatively, many of the other steps described throughout this description may be used to further reduce the potential of fraudulent access or use of the accounts of customers (e.g., separation of payment information and identity information on the tag 193, time stamps, instructions to automatically transmit information, count numbers, etc.).

In some embodiments, the decryption algorithm may be used to detect fraud. That is, for example, the card issuer computing system 108 may cross reference the received information within a database that includes information previously received. The card issuer computing system 108 may include a security process that automatically recognizes that the cryptographic key, the seed information that was used to generate the cryptographic key, and/or the count number was previously received and determine that the information was intercepted or hacked by a fraudulent actor. That is, the card issuer computing system 108 may store the information received from multiple customer devices 102 over time within a database and cross-reference or otherwise check to make sure that each time new information that is indicative of an identity of a customer is received, that the new information has not previously been received. For example, if new information is received that includes an encrypted cryptographic key and a seed (e.g., that should have been randomly generated) that are identical to a previously received encrypted cryptographic key and previously received seed, then the card issuer computing system may make the determination that there is likely a fraudulent actor or computing system that has intercepted the previously received cryptographic key and seed and is now trying to use them in a fraudulent manner. Thus, in such example, the card issuer computing system 108 may automatically disable the account associated with the transaction card 104, reject or deny access to the account, and/or flag the internet protocol (IP) address from which the new information (e.g., the suspected fraudulent information) was received from. In some embodiments, where the card issuer computing system 108 has determined a likelihood of a fraudulent attempt to access an account associated with the transaction card 104, the card issuer computing system 108 may automatically generate and send an email or other electronic notification to an employee of the card issuer and/or to the user of the transaction account in order to notify them of the potential fraudulent activity.

At process 922, the card issuer computing system 108 identifies an identity of the customer associated with the transaction card based on the received information (e.g., and/or the output of the decryption algorithm). The card issuer computing system 108 may identify the customer associated with the transaction card via cross-referencing the received or decrypted information indicative of the identity of the user with multiple references, keys, or tokens within a database, where each of the multiple references, keys, or tokens correspond to a customer and to a customer profile. In some embodiments, as explained above, the card issuer computing system 108 may also use information indicative of an identity of the customer device 102 (e.g., received during the communications at process 918) and cross-reference, verify, or check that the information identifying the customer device 102 belongs or is known to have been used by the customer in the past.

At process 924, the card issuer computing system 108 authenticates the customer. If the customer can be authenticated based on the received information of process 918, the card issuer computing system 924 may automatically go to process 926. For example, if the customer profile of the customer does not require that additional authentication information is needed when logging in and the identity of the customer device 102 is recognized by the card issuer computing system 108 as belonging to the customer, then the customer may be authenticated and the card issuer computing system 108 may proceed to process 926. If the customer cannot be authenticated based on the received information of process 918, the card issuer computing system 108 may automatically generate an electronic notification and push or transmit the electronic notification to the customer device 102 to prompt the user for additional authentication information at process 910. For example, if the customer profile associated with the customer of the transaction card 104 requires, as a preference or rule of the customer, that additional authentication information is needed then the system may proceed to process 910. In another example, the default of the card issuer computing system 108 may always be to generate an electronic notification and push or transmit the electronic notification to the customer device 102 to prompt the user for additional authentication information and proceed to process 910 unless the customer profile indicates that it is not needed (e.g., such as when the identity of customer device is known to be the customers).

Figure 11:
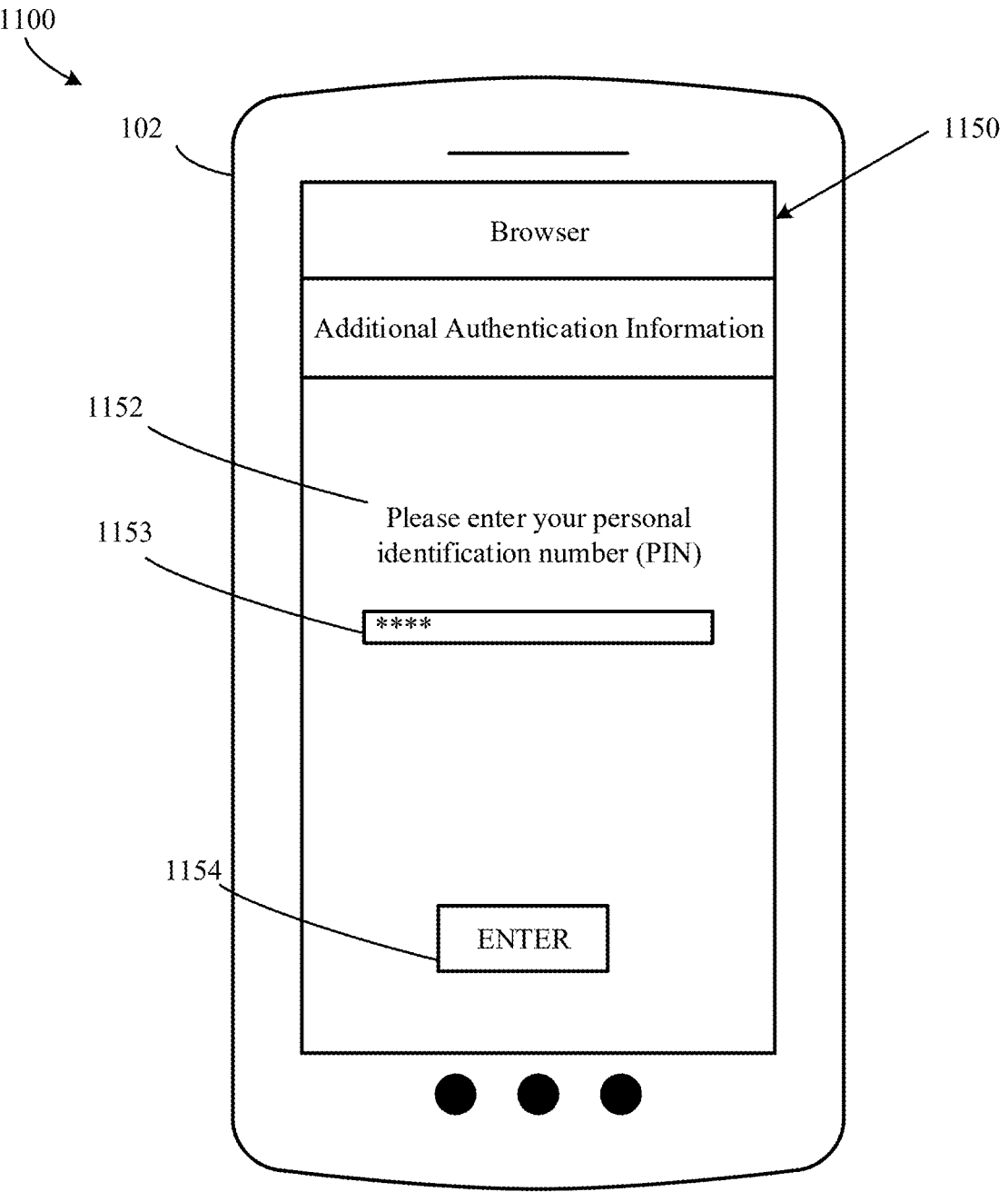
FIG. 11 depicts a customer device displaying a prompt for additional authentication information on a graphical user interface, according to an example embodiment.
Figure 12:
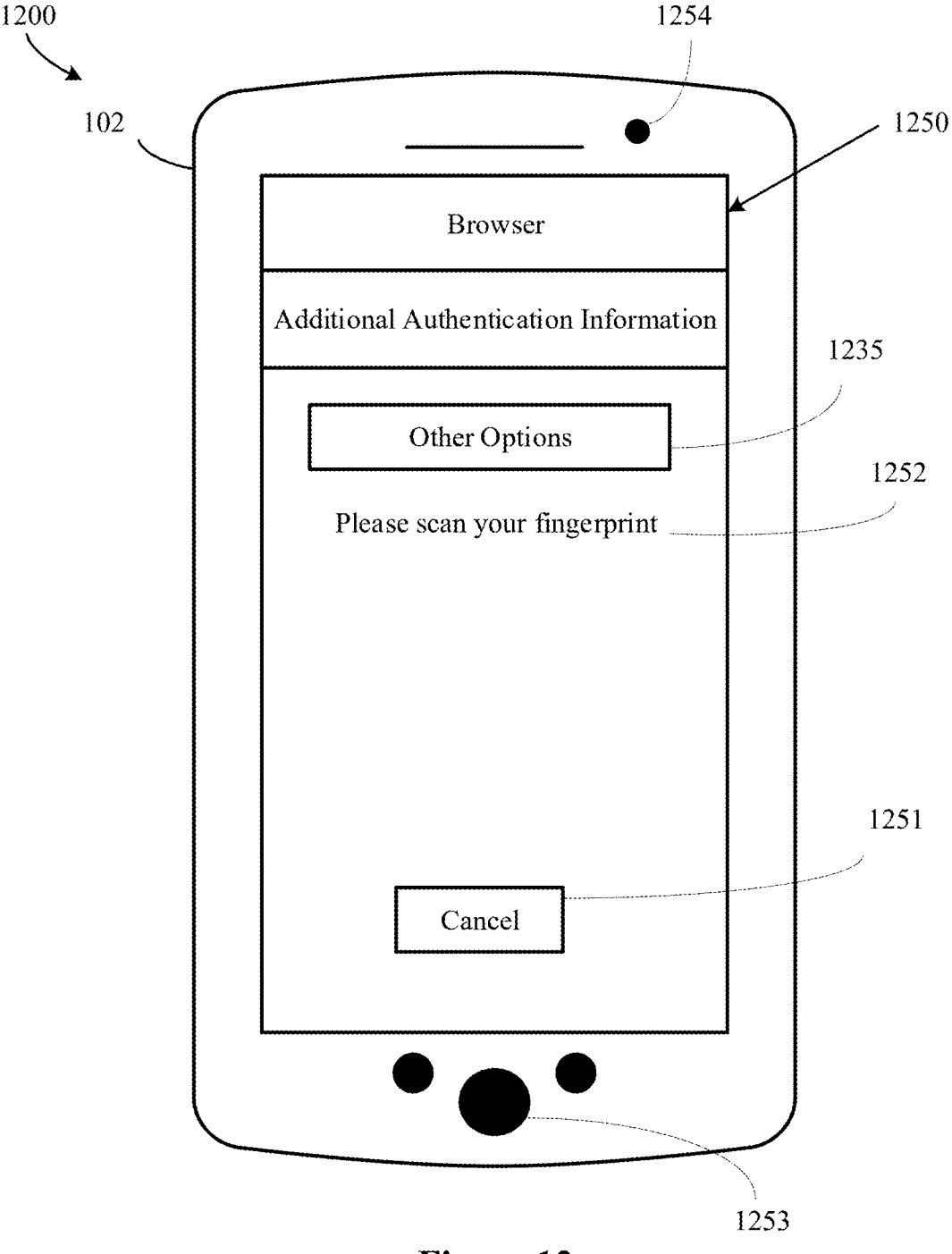
FIG. 12 depicts a customer device displaying a prompt for additional authentication information on a graphical user interface, according to an example embodiment.

At process 910, the customer device 102 prompts the user for additional authentication information. That is, the card issuer computing system 108 has determined that additional authentication information is needed in order to allow the mobile device (e.g., the device that requested access) to have access to any or all of the account information associated with the transaction card. The additional authentication information may be unique to the customer. That is, the type of additional authentication information needed at process 910 may have been prescribed by the user (e.g., the owner of the account and transaction card) to be a particular piece of additional authentication information. In some embodiments, the type of additional authentication information may have a default preference where the user is prompted to provide a particular piece of additional authentication information. In some embodiments, the user may be able to select, on the mobile device at process 910, the type of additional authentication information that the user would like to enter. In some embodiments, the additional authentication information includes biometric information (e.g., a thumb print on a thumb reader of the mobile device or facial recognition via a camera on the mobile device), a personal identification number (PIN), the last four of the social security number of the user associated with the account, security questions, code words or sentences, or a combination thereof. For example, FIG. 11 depicts one example of a graphical user interface on a customer device that prompts the user for additional authentication information (e.g., a PIN number). In another example, FIG. 12 depicts one example of a graphical user interface on a customer device that prompts the user for additional authentication information (e.g., biometric data). Further discussion of each of these examples and figures are provided below.

At process 912, the customer device 102 receives the authentication information. That is, at process 912, the user interfaces with the customer device 102 and enters their additional authentication information. In some embodiments, the customer device 102 encrypts the additional authentication information in response to receiving the additional authentication information. For example, code on a mobile application or embedded within the website may take the additional authentication information and run it through an encryption algorithm that scrambles or obfuscates the additional authentication information automatically in response to receiving the additional authentication information or in response to receiving an input from the user (e.g., the selection of an "Enter" or other confirmation icon displayed along with the prompt for additional authentication information) that is intended to cause the customer device 102 to transmit the additional authentication information. In some embodiments, the encryption algorithm has an associated decryption algorithm that is known or stored via the card issuer computing system 108. In this way, the encryption algorithm can obfuscate the additional authentication information during the transmission of the additional authentication information and the card issuer computing system 108 can decrypt the transmitted data in order to recover, use, or determine the additional authentication information.

At process 914, the customer device 102 transmits the additional authentication information to the card issuer computing system 108, which may then use the additional authentication information to authenticate the user at process 924. For example, the customer device 102 may automatically transmit the additional authentication information in response to receiving from the user the additional authentication information. In some embodiments, the customer device 102 may transmit the additional authentication information (e.g., or the encrypted additional authentication information) in response to receiving an input from the user (e.g., the selection of an "Enter" or other confirmation icon displayed along with the prompt for additional authentication information) that is intended to cause the customer device 102 to transmit the additional authentication information.

The additional authentication information may then be decrypted and used to authenticate the customer at process 924. In this way, the card issuer computing system provides an additional layer of security to ensure that only the users (e.g., via the customer device) that are authorized to access particular information of the account. If the additional authentication information is sufficient, the card issuer computing system 108 has authenticated the customer and proceeds to process 926. If the additional authentication information, is not sufficient the card issuer computing system 108 may cause the customer device 102 (e.g., via sending a signal to the customer device 102) to re-prompt the user and re-enter process 910.

In some embodiments, the card issuer computing system 108 may count the number times that process 910 has been repeated without success and automatically, in response to the count exceeding a pre-determined number, either disable the account, send an electronic notification (e.g., email, text, or instant message) to an employee of the card issuer, send an electronic notification (e.g., email, text, or instant message) to the user, and refuse to allow the customer device 102 to have access to the account until the customer device 102 has been verified. For example, the card issuer computing system 108 may refuse to allow the customer device 102 to have access to the account (e.g., not authenticate the customer) based on information received that identifies the customer device 102 (e.g., internet protocol IP address, MAC identifier, or other electronic identifier). In some embodiments, the customer device 102 may refuse to allow the customer device 102 to have access to the account for a pre-determined amount of time (e.g., 3 hours, 1 day, etc.). Or, other measures may be implemented until the customer device 102 can be verified by either an employee of the card issuer or the user associated with the transaction card. For example, the electronic notification sent to the user may prompt the user to call an employee (e.g., a customer service line) of the card issuer in order to verify the customer device 102 or may include a selectable icon therein that the user may select in order to indicate to the card issuer computing system 108 that the customer device 102 is indeed a verified customer device 102 that the user has access to or that the customer device 102 is fraudulent and the user had not tried to access the account. In response to receiving and indication that the customer device 102 is fraudulent, the card issuer computing system 108 may, in response, deactivate the transaction card and add any electronic identification information of the customer device 102 (e.g., IP address or identifying protocol information) to a list within the database that can be used to cross-reference future requests and automatically reject the request based on a determination that the request is coming from a fraudulent customer device 102.

The additional authentication information may be determined to be sufficient if the card issuer computing system receives data that corresponds to one or more pieces of data that are stored within a customer profile within a database on the card issuer computing system 108. For example, as discussed above, the customer profile of a user associated with the transaction card may be stored within a database of the card issuer computing system 108. The customer profile may be identified and retrieved or accessed based on the identity of a user associated with the transaction card 104 identified at least at process 922. The customer profile may include one or multiple pieces of information that can be cross-referenced to the additional authentication information in order to authenticate the customer device 102. The card issuer computing system 108 may take the received additional authentication information and cross-reference the received additional authentication information within a particular field within the customer profile and if they match, then proceed to process 926, and if they don't match, determine that the additional authentication information is not sufficient. In some embodiments, the particular field within the customer profile that is cross-referenced with the additional authentication information is determined by the card issuer computing system 108 based on the particular type of additional authentication information (e.g., PIN, biometric, or other identifying information) that was prompted for at process 910.

At process 926, the card issuer computing system 108 allows the customer access to at least a portion of the online account associated within the transaction card. In some embodiments, the card issuer computing system 108 may also allow the user to change some fields of information associated with the online account. For example, the card issuer computing system 108 may allow the customer to update a password associated with the online account via the customer device 102 at process 926 (e.g., in response to the user and customer device 102 being authorized at least partially from the contactless communication). In another example, the card issuer computing system 108 may allow the customer to transfer money into or out of the online account via the customer device 102 at process 926. In other words, at process 926, the card issuer computing system 108 has authenticated the customer device 102 (e.g., at least partially in response to the contactless communication) and allows the customer device 102 to access, change, and/or display at least a portion of the account associated with the identified customer (e.g., and owner/user of the transaction card). Process 926 may have a set duration. That is, the card issuer computing system 108 may only allow customer access via the customer device 102 for a pre-determined amount of time (e.g., 30 minutes, 1 hour, etc.). In some embodiments, the card issuer computing system 108 may disable customer access (e.g., end process 926) after a pre-determined amount of time (e.g., 10 minutes) of inactivity (e.g., a time period where the card issuer computing system 926 is not receiving any customer inputs via the customer device 102).

At process 916, the customer device 102 displays at least a portion of the online account information via graphical user interface. In some embodiments, the customer device 102 receives a signal in response to the card issuer computing system 108 proceeding to process 926 (e.g., in response to the customer device 102 and being authenticated at least partially as a result of the contactless communication) that causes the customer device 102 to display a home page of the online customer account. The user may interact with one or multiple selectable icons presented via the graphical user interface on the customer device 102 (e.g., presented in response to receiving signals from the card issuer computing system 108) in order to update account information, update a travel itinerary, move funds from one account to another, pay a loan payment, access the account number and routing number, access a peer-to-peer payment system, etc. In some embodiments, the card issuer computing system 108 may only provide access to particular information. For example, in an embodiment where a user of the customer device 102 is using the transaction card in order to authenticate he/she to reset or change online account credentials (e.g., a username or password) the card issuer computing system 108 may send a signal to the customer device 102 that causes the customer device 102 to display selectable icons or fields (e.g., to enter in a new password) that allow the customer to reset or change the online credential. That is, in some embodiments, the type of information and amount of information that is displayed at process 916 may depend on what the initial request to the card issuer computing system 108 was for, rules stored in the customer profile about what may be displayed or accessed, or policies of the card issuer.

Figure 10:
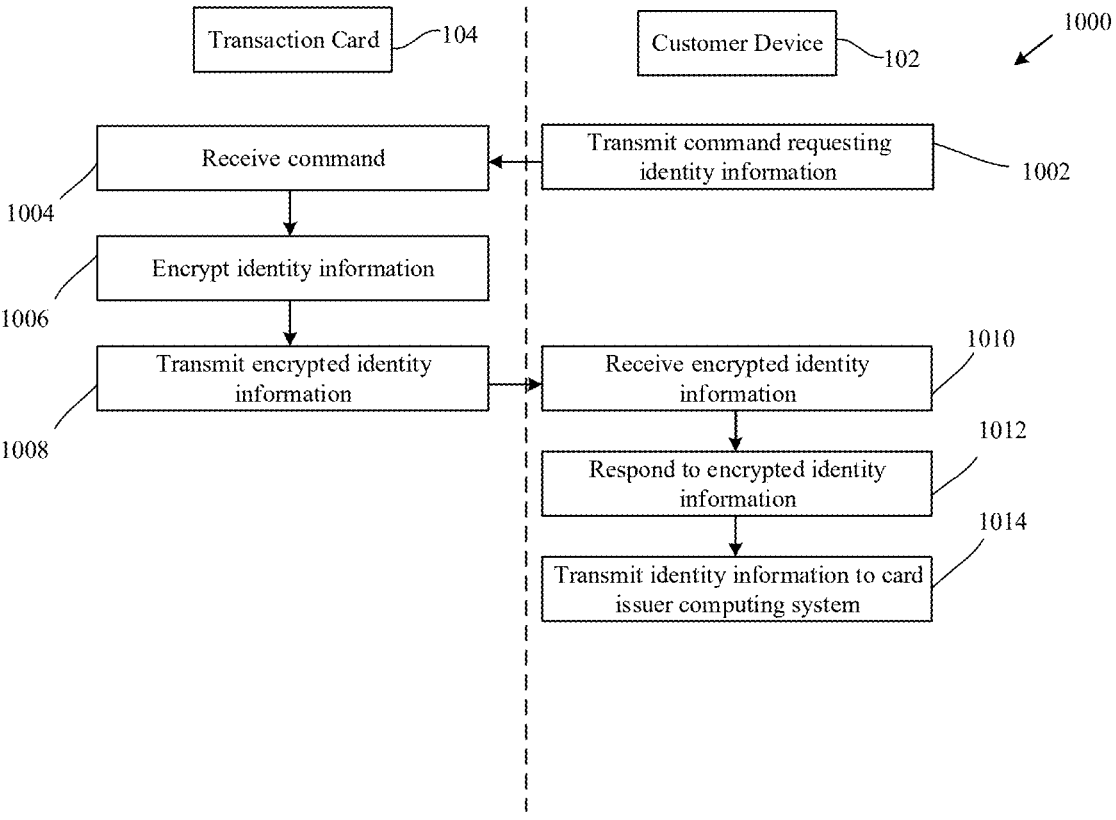
FIG. 10 depicts a flow diagram of a method of communication between a customer device and a transaction card, according to an example embodiment.

Referring now to FIG. 10, a flow diagram of a method 1000 of a communication between a customer device and a transaction card is shown, according to an example embodiment. That is, FIG. 10 is one example of how a customer device may communicate with a transaction card via contactless communication, in some embodiments, the process may be different, have additional steps, or the particular processes may be performed by the transaction card and/or the customer device.

At process 1002, the customer device 102 transmits a command requesting identity information to a transaction card 104 via a contactless communication. The customer device 102 generates a command that is configured to cause the transaction card 104 to respond by transmitting identification information to the customer device 102. The customer device 102 may transmit the card via activating an NFC tag reader on the customer device 102 and positioning the customer device 102 adjacent to a passive NFC tag located on the transaction card 104. Electromagnetic induction generated by the NFC tag reader may create a current in the passive NFC tag to power circuitry of the NFC tag. After the circuitry of the NFC tag is powered up, the NFC may sync with the NFC card reader and data may be exchanged therebetween. The customer device 102 transmits the command via the wireless (e.g., contactless) communication between the NFC reader and the NFC tag. In some embodiments, the command includes a request for a particular type of information such as information indicative of the user associated with the card, payment account information, account information, or a uniform resource locator. In some embodiments, the passive NFC tag includes information indicative of account (e.g., payment account) information and information indicative of an identity of the user. In some embodiments, the information indicative of account (e.g., payment account) information is in the form of a first cryptographic key and information indicative of an identity of the user is in the form of a second cryptographic key. In some embodiments, the passive NFC tag includes information indicative of an identity of the user in the form of a cryptographic key, a cryptographic algorithm, or a digital certificate. In some embodiments, a first command from a NFC reader may cause the transaction card to begin a transaction process via causing the transaction card 104 to send the information indicative of the payment account and a second command from a NFC reader may cause the transaction card to send the information indicative of the identity of a user associated with the transaction card. In this way, in some embodiments, the customer device 102 (and/or the card issuer computing system 108) does not have to begin a complicated transaction sequence and/or involve a third party computing system (e.g., Discover, Visa, Mastercard, American Express, etc.) in order to obtain the identity information. Rather, the command from the customer device 102 sent to the transaction card 104 may simply request for identity information and be independent of the interactions that may occur when the transaction card 104 is used for payments. However, in some embodiments, the information indicative of account information may be used for both transactions and to identify the user associated with the transaction card 104.

For example, in some embodiments, the command may include a random bit string (e.g., a random number) and a request. In some embodiments, the request identifies a particular block of memory within the NFC tag that the customer device 102 would like to receive. In some embodiments, the request identifies the information type requested (e.g., information indicative of the identity of the user associated with the transaction card, payment information, etc.) and the passive NFC tag determines what information (and whether to encrypt the information) to transmit to the customer device 102 based on the command. In some embodiments, the customer device 102 generates the random number via a random number generator and includes the random number in the command. In some embodiments, the command may be in a NFC data exchange format (NDEF).

At process 1004, the transaction card 104 receives the command. The transaction card 104 receives the command via the contactless communication. For example, in some embodiments, an integrated circuit located on the transaction card 104 may receive the command via an antenna. In some embodiments, the antenna is the same antenna in which the customer device 102 is supplying power via electromagnetic inductions to the integrated circuit located on the transaction card.

The integrated circuit may receive the command and determine how to respond. For example, the integrated circuit may determine the type of information that is being requested based on the request and may determine a particular algorithm to use based on the type of information that is being requested. Further, the integrated circuit may also determine the format that the data, cryptographic key, or digital certificate is to be sent back to the customer device 102. That is, in some embodiments, the integrated circuit may determine, based on the request, that the data to be sent back to the customer device is to be embedded within a uniform resource locator (URL). In some embodiments, the URL that is to have data or information embedded therein is stored on the NFC tag. In some embodiments, the integrated circuit may default to sending information (or determine to send information based on the request) back to the customer device 102 in NDEF format (e.g., as a NDEF message or NDEF record).

At process 1006, the transaction card encrypts the identity information. For example, the integrated circuit on the transaction card may implement an encryption algorithm that uses a key or data string on the transaction card 104, the random bit string (e.g., random number), and/or a count of how many times the encryption algorithm has been performed by the transaction card 104 and outputs a single bit sequence. The bit sequence is indicative of the encrypted identification information (e.g., encrypted cryptographic key) of a user associated with the card. In some embodiments, the encryption algorithm may have more or fewer inputs. The count of how many times the encryption algorithm has been performed by the transaction card 104 may be held in a register (e.g., a memory register) of the integrated circuit and be incremented via the execution of the encryption algorithm. In some embodiments, the encryption algorithm time stamps the bit sequence that is generated with the time that the encryption algorithm is being ran. The encryption algorithm may be programmed onto the transaction card 104 at the time of manufacture and a card issuer computing system 108 may have a corresponding decryption algorithm stored within a database. In some embodiments, the encryption algorithm is configured to perform either a symmetric encryption or an asymmetric encryption.

At process 1008, the transaction card transmits the encrypted identity information. For example, the transaction card 104 (e.g., via the integrated circuit and the antenna of the passive NFC tag) transmits the requested information to the customer device 102. In some embodiments, the transaction card 104 may send an error message or other default message if the command was not received, was partially received, was unreadable, or undeterminable by the transaction card. In some embodiments, the transaction card 104 transmits the bit sequence that is indicative of the encrypted identification information of a user associated with the card, count number of how many times the encryption algorithm has been ran, and/or any other information that was generated and/or used by the transaction card 104 in generating the encrypted identification information.

In some embodiments, the transaction card 104 may first package the requested information. For example, in some embodiments, the transaction card 104 may, by default or based on the request (e.g., a particular request or command that asks for a URL and identity information), package or embed the information into a URL that is stored on the transaction card 104. In some embodiments, the transaction card 104 (e.g., the integrated circuit having executable instructions) may cause the information (e.g., bit sequence, count, random number) to be embedded within a query string of a URL that is stored with the transaction card 104. The URL may then be configured to cause the information to be sent via the internet to a card issuer computing system 108 or other computing system automatically in response to a customer device 102 executing or navigating to the URL. For example, the URL stored on the transaction card 104 may contain a domain name associated with the card issuer computing system 108 and when the URL is executed or entered into a browser, the URL may cause the browser to navigate the domain of the card issuer computing system 108 and pass the identity information associated with the transaction card via the query string. In this way, the identity information from the transaction card 104 may be automatically passed to the card issuer computing system 108 without particular interventions on the data from the customer device 102. Thus, the transaction card 104 may pass the identity information via any customer device 102 that has web or network access and the customer device 102 and the customer device 102 may not be required to have specialized code or applications designed to process and/or transmit the encrypted data (e.g., the encrypted cryptographic key) to the card issuer computing system 108. In this way, all customer devices that have a contactless chip may be used by a user to securely access their account via a contactless tap.

At process 1010, the customer devices receives the encrypted identity information. At process 1012, the customer device responds to the encrypted identity information. In some embodiments, the customer device 102 may receive the encrypted identity information from the transaction card 104 and perform an algorithm on the received information intended to further obfuscate or encrypt the identity information before transmitting. For example, in some embodiments, the customer device 102 may receive the encrypted identity information and package the encrypted identity information along with information that identifies the customer device 102 (e.g., a name of the customer device, MAC ID number, or other number and protocol). Further, in some embodiments, the customer device 102 may package the encrypted identity information, the random number (e.g., the seed) that was sent within the command, and time stamp the package.

Further, the package also may allow that the card issuer computing system 108 to redundantly check the authorizations of the customer device 102 to have access to at least a portion of the online customer account. For example, the card issuer computing system 108 may determine an identity of the user associated with the account based on a decryption of the identity information, cross reference the identity information of the phone (e.g., packaged within the package or otherwise received by the card issuer computing system 108) with information within the user's customer profile to check that the customer device 102 is or has been associated with the customer, and/or compare the information received (e.g., time stamps, the random number, or encrypted information) to a database of previously received information to check whether the information received is merely a duplicate of previously received information. In this way, via creating the package, the customer device 102 may allow for enhanced, redundant security within the computing system.

At process 1014, the customer device 102 transmits the encrypted identity information to a card issuer computing system. For example, in some embodiments, the customer device 102 transmits the package (e.g., package including the information received from the transaction card, information regarding the identity of the customer device 102, time stamps, information from the transaction card that has been encrypted via an encryption algorithm executed on the customer device 102, or other data, etc.) to the card issuer computing system 108. The card issuer computing system 108 may then use the package to authenticate a user of the customer device 102.

In another example, the customer device 102 may automatically transmit the information received from the transaction card 104 directly to the card issuer computing system 108. That is, as discussed above and herein, the customer device 102 may receive a URL from the transaction card 104 that contains the identity information of a user associated with the card embedded thereon. The customer device 102 may automatically recognize that the customer device 102 has received a URL and automatically open and/or navigate to the URL, which may cause the information indicative of the identity of the user (e.g., the cryptographic key, and random number) to be passed directly to the card issuer computing system 108. In some embodiments, the customer device 102 may be running a mobile application or already be navigated to a URL that is associated with the card issuer computing system 108 which contain code that when executed by the customer device 102, cause the customer device 102 to send the command in process 1002 and automatically pass any received information directly to the card issuer computing system 108 via the network. In this way, the customer device 102 may act as a conduit between the transaction card 104 and the card issuer computing system 108. The customer device 102 may be utilized as a conduit in some embodiments without increasing security risks because the encrypted identity information (e.g., the cryptographic key and cryptographic algorithm) allows the information to be passed over the network with lesser security concerns. Alternatively or additionally, in some embodiments, the customer device 102 may still execute an extra step of packaging and/or encrypting information for an added layer of security. However, because the information indicative of the identity of the user associated with the card may be different than the payment account information on the transaction card, any potential information that is intercepted by a fraudulent actor may not be useful (e.g., because the intercepted information cannot be used for transactions). Additionally, because the transaction card 104 may automatically perform an encryption algorithm (e.g., a cryptographic algorithm) in response to receiving the command in process 1004, any potential information that is intercepted by a fraudulent actor may not be used to identify the user associated with the transaction card or allow the fraudulent actor to access an online account of the user.

Referring now to FIG. 11, an exemplary image of a customer device prompting a user for additional authentication information via a graphical user interface 1100 is shown, according to an example embodiment. For example, FIG. 11 depicts an example of a customer device 102 at process 910 described in reference to FIG. 9. The graphical user interface 1100 may be presented on a display of the customer device 102 in response to receiving instructions to display or redirect a mobile page 1150 (e.g., a browser page or a mobile page being displayed within an application associated with the card issuer downloaded onto the customer device) that prompts the user for additional authentication information. The prompt for additional authentication information may include text 1152 that is intended to instruct the user and a field that allows the user to enter information 1153 (e.g., via a keyboard, touch screen, or other input/output device).

For example, in some embodiments, the text 1152 instructs the user to enter in a personal identification number (PIN). In some embodiments, the text 1152 instructs the user to enter in the last four digits of the social security number or other personally identifying information. The user may then select the field that allows the user to enter information 1153 into the customer device 102. In some embodiments, the customer device 102 automatically accepts and begins to process the input (e.g., the PIN) as soon as a particular number of input digits are received or entered (e.g., in response to 4 numbers being entered). In some embodiments, the customer device 102 accepts and begins the process the input (e.g., the PIN) in response to a selection of a selectable icon 1154 by the user via the graphical user interface 1100. For example, the selectable icon 1154 may be intended to indicate to the customer device 102 when the user is done entering in the information he/she was prompted for. The selectable icon 1154 may also include text (e.g., "Enter," "Okay," "Go," etc.) that indicates to the user that the button is to be pressed or selected after the input into the field 1153 is complete.

Referring now to FIG. 12, an exemplary image of a mobile device prompting a user for additional authentication information via a graphical user interface 1200 is shown, according to an example embodiment. For example, FIG. 12 depicts an example of a customer device 102 at process 910 described in reference to FIG. 9. The graphical user interface 1200 may be presented on a display of the customer device 102 in response to receiving instructions to display or redirect a mobile page 1250 (e.g., a browser page or a mobile page being displayed within an application associated with the card issuer downloaded onto the customer device). The graphical user interface 1200 includes a prompt for additional authentication information, which includes text 1252 instructs the user to enter the user's biometric information into the customer device 102 via an input/output device such as a fingerprint reader 1253 or a camera 1254, and a cancel button 1251. In some embodiments, the input/output device may include more or fewer varieties, types, or forms.

For example, in some embodiments, the text 1252 instructs the user to scan his/her fingerprint on the fingerprint reader 1253. In some embodiments, the text 1252 instructs the user to look into the camera 1254 for facial recognition. The user may respond to the text 1252 by placing his/or finger onto the fingerprint reader 1253 or looking into the camera 1254. In some embodiments, the customer device 102 automatically responds to the input from the user and determines the identity of the user or packages the data to be sent to the card issuer computing system 108 for authentication of the identity of the user and customer device 102. For example, in some embodiments, the customer device 102 may receive a fingerprint as an input and automatically verify that the user of the phone is the owner of the phone (e.g., or has approved access to the phone) and the customer device 102 may transmit a signal to the card issuer computing system 108 that indicates that the user has been verified to be the one using the customer device 102. The card issuer computing system 108 may authenticate a customer based on the known identity of the customer device, signal that has verified the user of the customer device 102 (e.g., via the biometric fingerprint or facial recognition verification), and the encrypted cryptographic key. In this way, the authentication process for the card issuer computing system 108 includes multiple redundancies that increases the probability that only customers with the authority to access particular accounts may access the accounts.

In some embodiments, the graphical user interface 1200 may include a selectable icon 1235 that allows for a user to select the selectable icon 1235 in order to change the particular form or type of additional authentication information that is being prompted for (e.g., "Other Options"). For example, a user of the customer device 102 may select the selectable icon 1235 and the customer device 102 may navigate to or present a list of options of types or forms of additional authentication information that the user may enter in order to be authenticated by the card issuer computing system 108. The list of options may include options for the user to enter in a PIN (e.g., and thereby be redirected to a graphical user interface similar to the graphical user interface 1100 of FIG. 11), answer security questions, enter in the last four digits of a social security number of a user associated with the account, enter biometric information (e.g., fingerprint or facial recognition), etc. In this way, the graphical user interface 1200 allows for a customer to provide additional authentication information even when a PIN number may have been forgotten, the fingerprint reader 1253 may be broken or not working, the camera 1254 doesn't work, or other technical issues prevent the user from entering in the prompted for additional authentication information.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" or "computing system" may include hardware structured to execute the associated functions described herein. In some embodiments, each respective "circuit" or "computing system" may include machine-readable media for configuring the hardware to execute the associated functions described herein. The "circuit" or "computing system" may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" or "computing system" may include any type of component for accomplishing or facilitating achievement of the associated operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" or "computing system" may also include one or more processors communicatively coupled to one or more memory or memory devices. In this regard, the one or more processors may execute instructions stored in the memory or may execute instructions otherwise accessible to the one or more processors. The one or more processors may be constructed in a manner sufficient to perform at least the associated operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" or "computing system" as described herein may include components that are distributed across one or more locations.

An exemplary system for implementing the overall system or portions of the embodiments might include a computer(s), including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of accessing an account, the method comprising:
receiving, from a device, randomly generated seed information and an encrypted key or token generated by a card using the randomly generated seed information via a contactless communication between the card and the device;
decrypting the encrypted key or token using a decryption process that includes the randomly generated seed information and the encrypted key or token as inputs in response to determining that the randomly generated seed information does not match previously received seed information;
identifying, using the randomly generated seed information, a customer associated with the card; and
providing, to the device and based on the identification of the customer and the decrypted key or token, access to the account.

2. The method of claim 1, further comprising:
receiving, from the device, an indication that the customer has successfully logged into the device before receiving the randomly generated seed information.

3. The method of claim 1, further comprising:
receiving, from the device, an identification of the device; and
determining that the identification of the device is associated with the identified customer associated with the card.

4. The method of claim 1, wherein the decryption process includes a count number as an input and an output that is indicative of an identity of the customer associated with the card.

5. The method of claim 4, wherein identifying the customer further comprises cross-referencing the output that is indicative of the identity of the customer with multiple customer profiles stored within a customer database.

6. The method of claim 5, wherein identifying the customer further comprises automatically disabling the account in response to a determination that a value of at least one of the randomly generated seed information or a value of the count number had previously been received.

7. The method of claim 1, further comprising:
authenticating the customer in response to identifying the customer.

8. The method of claim 7, wherein authenticating the customer is further based on additional authentication information received from the device.

9. The method of claim 8, wherein the additional authentication information comprises a personal identification number (PIN) or biometric data.

10. A computing system, comprising:
a processing circuit having one or more processors and one or more memory devices, the processing circuit structured to:
receive, from a device, randomly generated seed information and an encrypted key or token generated by a card using the randomly generated seed information via a contactless communication between the card and the device;
decrypt the encrypted key or token using a decryption process that includes the randomly generated seed information and the encrypted key or token as inputs in response to determining that the randomly generated seed information does not match previously received seed information;
identify, using the randomly generated seed information, a customer associated with the card; and
provide, to the device and based on the identification of the customer and the decrypted key or token, access to the account.

11. The computing system of claim 10, wherein the processing circuit is further structured to:
receive, from the device, an indication that the customer has successfully logged into the device before receiving the randomly generated seed information.

12. The computing system of claim 10, wherein the processing circuit is further structured to:
receive, from the device, an identification of the device; and
determine that the identification of the device is associated with the identified customer associated with the card.

13. The computing system of claim 10, wherein the decryption process includes a count number as an input and an output that is indicative of an identity of the customer associated with the card.

14. The computing system of claim 13, wherein the processing circuit is further structured to:
identify the customer by cross-referencing the output that is indicative of the identity of the customer with multiple customer profiles stored within a customer database.

15. The computing system of claim 14, wherein the processing circuit is further structured to:
identify the customer by automatically disabling the account in response to at least one of a determination that a value of the randomly generated seed information or a value of the count number had previously been received.

16. The computing system of claim 10, wherein the processing circuit is further structured to:
authenticate the customer in response to identifying the customer.

17. The computing system of claim 16, wherein the processing circuit is further structured to:
authenticate the customer based on additional authentication information received by the processing circuit from the device.

18. The computing system of claim 17, wherein the additional authentication information comprises a personal identification number (PIN) or biometric data.

19. A non-transitory computer readable medium having computer-executable instructions embodied therein that, when executed by at least one processor of a computing system, cause the computing system to perform operations comprising:
receiving, from a device, randomly generated seed information and an encrypted key or token generated by a card using the randomly generated seed information via a contactless communication between the card and the device;
decrypting the encrypted key or token using a decryption process that includes the randomly generated seed information and the encrypted key or token as inputs in response to determining that the randomly generated seed information does not match previously received seed information;

identifying, using the randomly generated seed information, a customer associated with the card; and providing, to the device and based on the identification of the customer and the decrypted key or token, access to the account.

20. The non-transitory computer readable medium of claim 19, wherein the decryption process includes a count number as an input and an output that is indicative of an identity of the customer associated with the card.

* * * * *